United States Patent
Wang et al.

(10) Patent No.: US 11,063,847 B2
(45) Date of Patent: Jul. 13, 2021

(54) SERVICE FUNCTION CHAIN MAPPING USING MULTIPLE PARALLEL MICROSERVICES INSTANCES

(71) Applicant: Fujitsu Limited, Kawasaki (JP)

(72) Inventors: Xi Wang, Murphy, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 16/106,097

(22) Filed: Aug. 21, 2018

(65) Prior Publication Data

US 2020/0067800 A1 Feb. 27, 2020

(51) Int. Cl.
| | | |
|---|---|---|
| *G06F 15/16* | (2006.01) | |
| *H04L 12/26* | (2006.01) | |
| *H04L 12/24* | (2006.01) | |
| *H04L 29/08* | (2006.01) | |

(52) U.S. Cl.
CPC ............ *H04L 43/045* (2013.01); *H04L 41/12* (2013.01); *H04L 67/16* (2013.01)

(58) Field of Classification Search
CPC .................................................. H04W 43/045
See application file for complete search history.

(56) References Cited

U.S. PATENT DOCUMENTS

| | | | | |
|---|---|---|---|---|
| 2017/0279668 | A1* | 9/2017 | Shevenell | H04L 41/0677 |
| 2018/0227243 | A1* | 8/2018 | Zhang | H04L 41/12 |
| 2018/0332485 | A1* | 11/2018 | Senarath | G06F 9/45558 |

OTHER PUBLICATIONS

"Fujitsu Develops Technology to Simplify Design and Operation of Hybrid- and Multi-Cloud Network Infrastructure," Fujitsu Laboratories Ltd., Fujitsu Laboratories of America, Inc., Mar. 7, 2017. http://www.fujitsu.com/global/about/resources/news/press-releases/2017/0307-01.html; 5 pages.

* cited by examiner

*Primary Examiner* — Kevin T Bates
*Assistant Examiner* — Clarence D McCray
(74) *Attorney, Agent, or Firm* — Baker Botts LLP

(57) ABSTRACT

Systems and methods for mapping service function chains to physical network resources include receiving a service function chain request specifying multiple service functions including a service access point, generating a service graph including service links between consecutive service functions, receiving resource information describing capabilities of physical network resources and a topology of the physical network, generating a resource graph including infra links between pairs of connected physical network resources, creating, dependent on the service graph and the resource graph, multiple solutions for mapping the service functions to the physical network resources, and outputting one or more mapping solutions. Each of generating the service graph, generating the resource graph, and creating the mapping solutions may be performed by one or instances of respective microservices that operate in parallel. The systems may also include respective microservice instances for creating end point mappings, creating infra node mappings, and pruning and ranking mapping solutions.

22 Claims, 16 Drawing Sheets

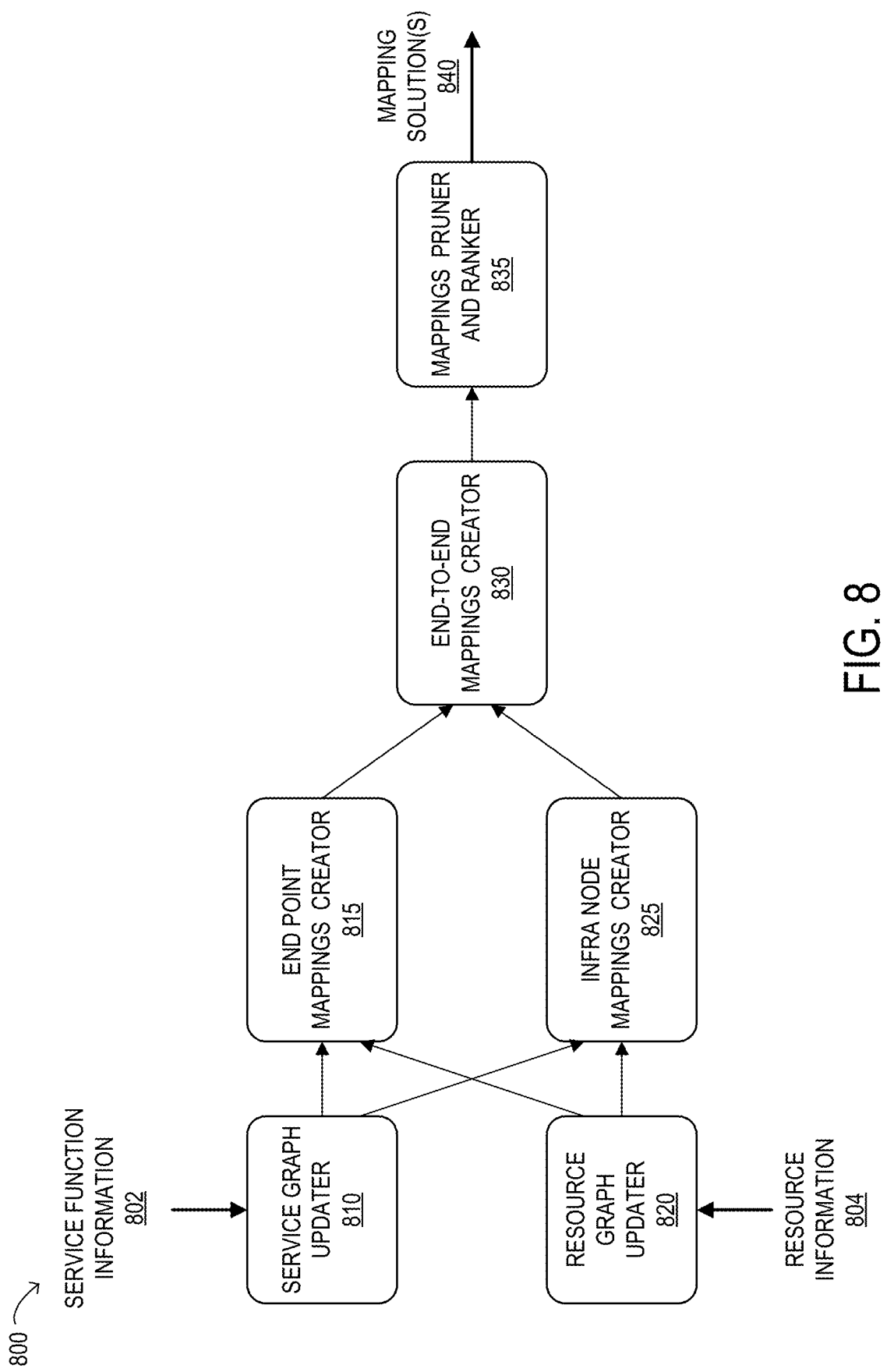

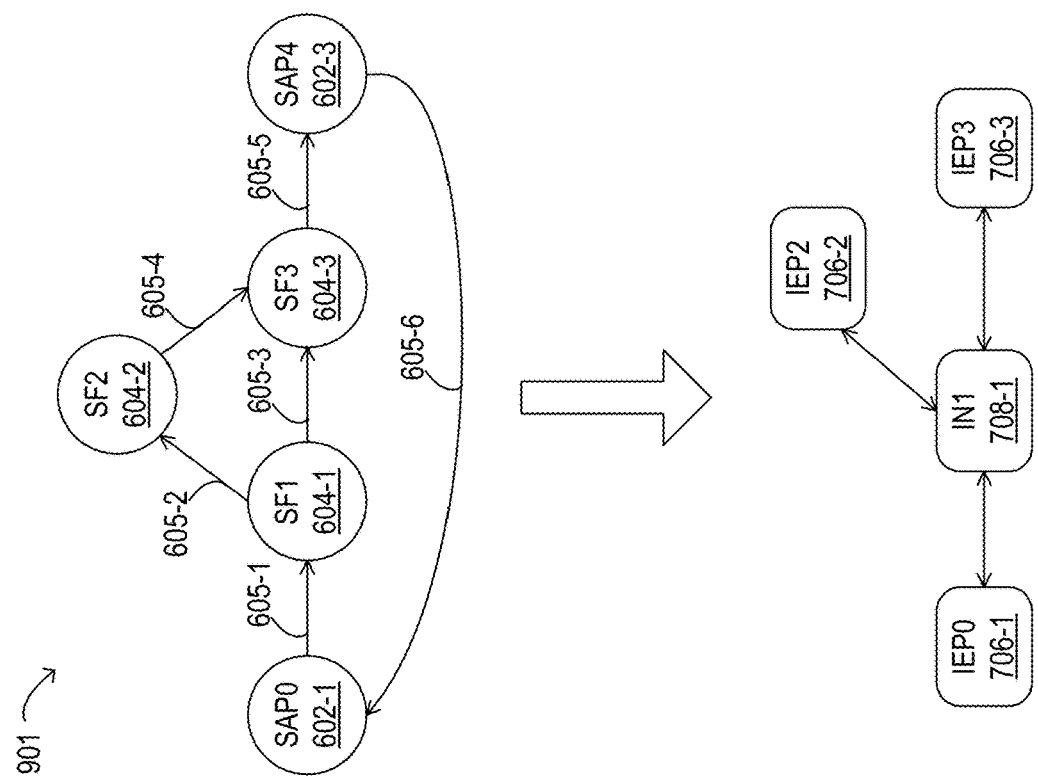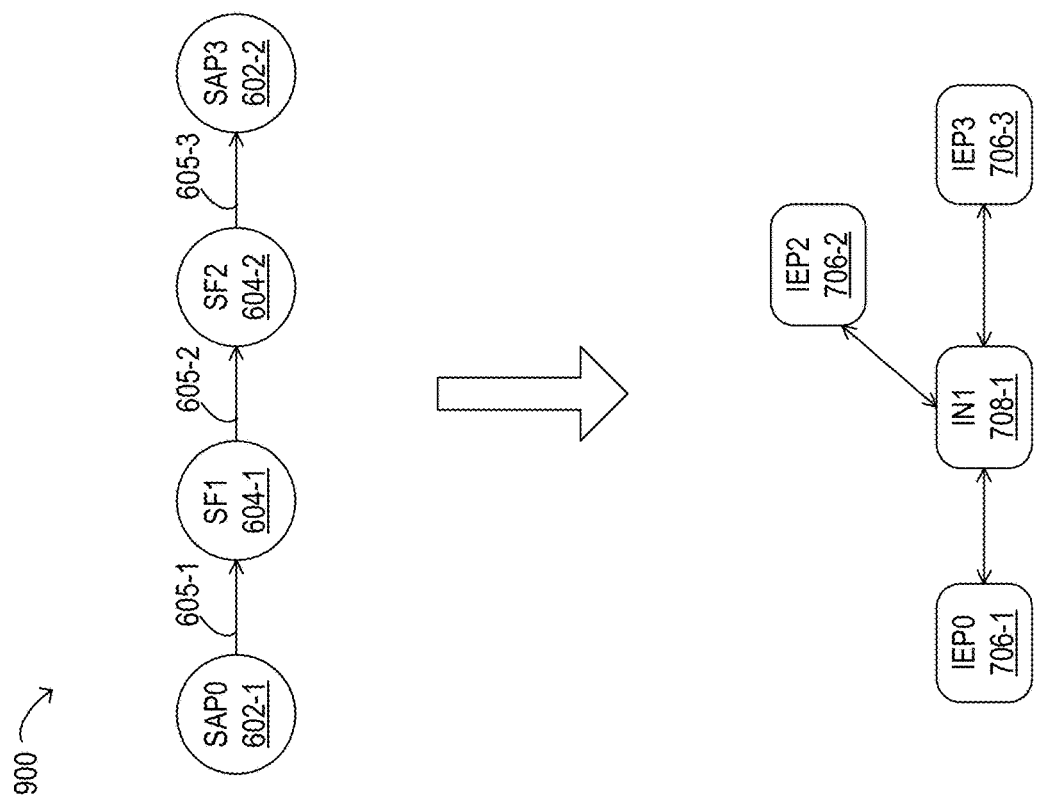

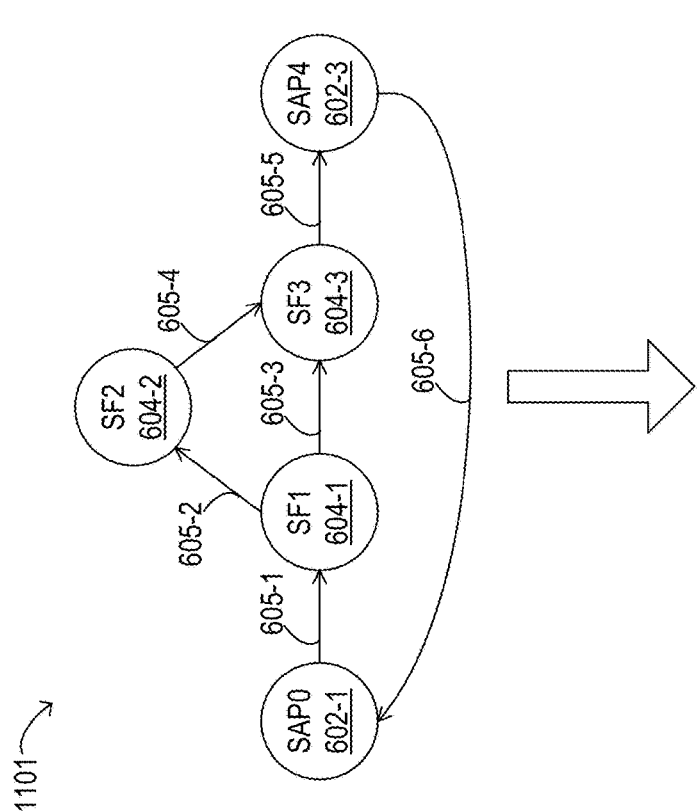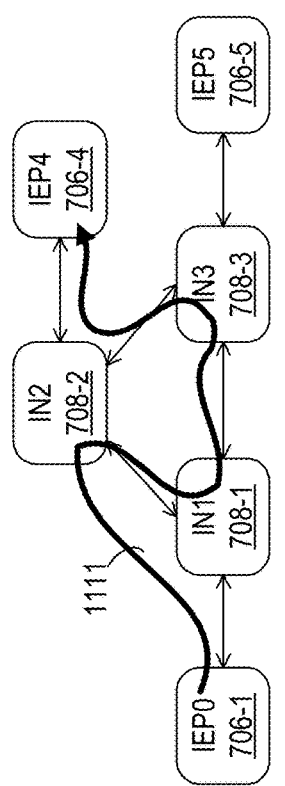
FIG.11B
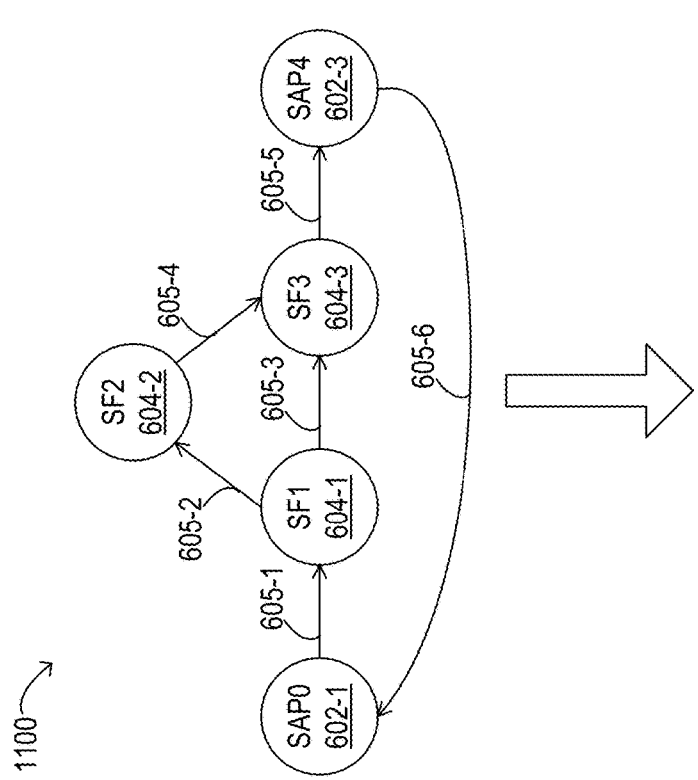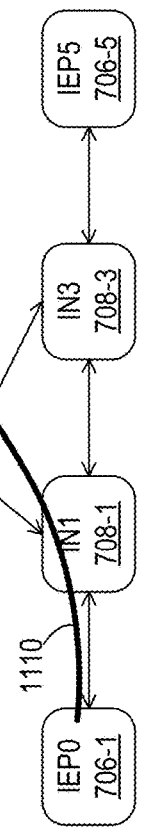
FIG.11A

SERVICE FUNCTION CHAIN MAPPING USING MULTIPLE PARALLEL MICROSERVICES INSTANCES

BACKGROUND

Field of the Disclosure

The present disclosure relates generally to network function virtualization and, more particularly, to systems and methods for performing service function chain mapping using parallel microservices.

Description of the Related Art

Emerging network applications, such as cloud and big data applications, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-domain networks. For example, a network service may traverse one or more consumer broadband networks, mobile backhaul networks, mobile packet core networks, and/or virtual private networks.

Most existing SDN/NFV platforms support only manual service function chaining or service function chaining with a very limited amount of automation. For example, in many of these platforms, a user is required to specify the placement of network service functions as well as the sequence in which the network service functions are chained across one or more physical networks, such as different data centers.

SUMMARY

In one aspect, a method for mapping service function chains to physical network resources includes receiving a first service function chain request specifying a first plurality of service functions including at least one service access point and one other service function, generating, for the first service function chain request, a service graph including first service links between consecutive ones of the first plurality of service functions, receiving first resource information describing capabilities of first physical network resources in a physical network and a topology of the physical network, generating, dependent on the first resource information, a resource graph including first infra links between pairs of connected ones of the first physical network resources, creating, dependent on the service graph and the resource graph, a first plurality of mapping solutions for mapping the service functions specified in the first service function chain request to respective ones of the first physical network resources, and outputting one or more of the first plurality of mapping solutions. Each of generating the service graph, generating the resource graph, and creating the first plurality of mapping solutions may be performed by a respective microservice, and the respective microservices that perform generating the service graph, generating the resource graph, and creating the first plurality of mapping solutions may operate in parallel.

In any of the disclosed embodiments, the method may further include receiving a second service function chain request specifying a second plurality of service functions, and, responsive to receiving the second service function chain request, updating the service graph to include second service links between consecutive ones of the second plurality of service functions and creating, dependent on the updated service graph, a second plurality of mapping solutions for mapping the service functions specified in the second service function chain request to respective ones of the first physical network resources.

In any of the disclosed embodiments, the method may further include receiving second resource information describing capabilities of second physical network resources in the physical network and, responsive to receiving the second resource information, updating the resource graph to include second infra links between pairs of connected ones of the second physical network resources and creating, dependent on the updated resource graph, a second plurality of mapping solutions for mapping the first plurality of service functions to respective ones of the second physical network resources.

In any of the disclosed embodiments, the method may further include pruning the first plurality of mapping solutions to remove mapping solutions that do not meet predefined criteria for mapping the first plurality of service functions to physical network resources. Pruning the first plurality of mapping solutions may be performed by a pruning and ranking microservice that operates in parallel with the respective microservices that perform generating the service graph, generating the resource graph, and creating the first plurality of mapping solutions, and outputting one or more of the first plurality of mapping solutions may include outputting at least a subset of the first plurality of mapping solutions remaining following the pruning.

In any of the disclosed embodiments, the method may further include ranking the first plurality of mapping solutions from most suitable for mapping the first plurality of service functions to physical network resources to least suitable for mapping the first plurality of service functions to physical network resources based on predefined ranking criteria. Ranking the first plurality of mapping solutions may be performed by a pruning and ranking microservice that operates in parallel with the respective microservices that perform generating the service graph, generating the resource graph, and creating the first plurality of mapping solutions, and outputting one or more of the first plurality of mapping solutions may include outputting, based on the ranking, a subset of the first plurality of mapping solutions.

In any of the disclosed embodiments, the method may further include creating a first plurality of end point mappings between each of one or more service access points specified in the first service function chain request and respective infra end point nodes in the first physical network resources, and creating a first plurality of infra node mappings between each of one or more service functions specified in the first service function chain request other than service access points and respective infra nodes in the first physical network resources. Creating the first plurality of mapping solutions may include combining the first plurality of end point mappings and the first plurality of infra node mappings. Creating the first plurality of end point mappings and creating the first plurality of infra node mappings may be performed by respective microservices that operate in parallel with the respective microservices that perform generating the service graph, generating the resource graph, and creating the first plurality of mapping solutions.

In any of the disclosed embodiments, creating the first plurality of end point mappings may include pruning the first plurality of end point mappings to remove end point mappings in which multiple service access points are mapped to a same infra end point node.

In any of the disclosed embodiments, at least one of the respective microservices that perform generating the service graph, generating the resource graph, and creating the first plurality of mapping solutions may include a plurality of microservice instances that operate in parallel to perform respective subsets of the operations of the microservice.

In any of the disclosed embodiments, the respective subsets of operations into which the operations of a given microservice are partitioned may be dependent on the functionality of the given microservice.

In any of the disclosed embodiments, in the service graph, the first service links between consecutive ones of the first plurality of service functions may be unidirectional links and, in the resource graph, the first infra links between pairs of connected ones of the first physical network resources may be bidirectional links.

In any of the disclosed embodiments, the method may further include replacing the respective microservice that performs generating the service graph, generating the resource graph, or creating the first plurality of mapping solutions with an alternate microservice that performs at least one of the functions of the respective microservice differently than does the respective microservice.

In another aspect, a system includes a processor having access to memory media storing instructions executable by the processor to implement a service function chain mapping system, the service function chain mapping system including a service graph updater, a resource graph updater, and an end-to-end mappings creator. The service graph updater may be configured to receive a first service function chain request specifying a first plurality of service functions including at least one service access point and one other service function and to generate, for the first service function chain request, a service graph including first service links between consecutive ones of the first plurality of service functions. The resource graph updater may be configured to receive first resource information describing capabilities of first physical network resources in a physical network and a topology of the physical network and to generate, dependent on the first resource information, a resource graph including first infra links between pairs of connected ones of the first physical network resources. The end-to-end mappings creator may be configured to generate, dependent on the service graph and the resource graph, a first plurality of mapping solutions for mapping the first plurality of service functions to respective ones of the first physical network resources. The service graph updater, the resource graph updater, and the end-to-end mappings creator may operate in parallel as respective microservices to collectively create the first plurality of mapping solutions.

In any of the disclosed embodiments, the service graph updater may be further configured to receive one or more additional service function chain requests, each specifying a respective plurality of service functions including at least one service access point and one other service function and to update, for each of the additional service function chain requests, the service graph to include respective service links between consecutive ones of the respective plurality of service functions specified in the additional service function chain request. The resource graph updater may be further configured to receive one or more additional resource information inputs, each describing capabilities of respective physical network resources in the physical network and to update, for each of the additional resource information inputs, the resource graph to include respective infra links between pairs of connected ones of the respective physical network resources described in the additional resource information input. The end-to-end mappings creator may be further configured to generate, responsive to each update of the service graph or the resource graph, a respective plurality of mapping solutions reflecting the update.

In any of the disclosed embodiments, the service function chain mapping system may further include a pruning and ranking microservice configured to perform one or more of pruning the first plurality of mapping solutions to remove mapping solutions that do not meet predefined criteria for mapping the first plurality of service functions to physical network resources, ranking the first plurality of mapping solutions from most suitable for mapping the first plurality of service functions to physical network resources to least suitable for mapping the first plurality of service functions to physical network resources based on predefined ranking criteria, and outputting, dependent on one or more of the pruning and the ranking, a subset of the first plurality of mapping solutions. The pruning and ranking microservice may operate in parallel with the service graph updater, the resource graph updater, and the end-to-end mappings creator.

In any of the disclosed embodiments, the service function chain mapping system may further include an end point mappings creator microservice configured to create a first plurality of end point mappings between each of one or more service access points specified in the first service function chain request and respective infra end point nodes in the first physical network resources, and an infra node mappings creator microservice configured to create a first plurality of infra node mappings between each of one or more service functions specified in the first service function chain request other than service access points and respective infra nodes in the first physical network resources. To generate the first plurality of mapping solutions, the end-to-end mappings creator may be configured to combine the first plurality of end point mappings and the first plurality of infra node mappings. The end point mappings creator microservice and the infra node mappings creator microservice may operate in parallel with the service graph updater, the resource graph updater, and the end-to-end mappings creator.

In any of the disclosed embodiments, the end point mappings creator microservice may be further configured to prune the first plurality of end point mappings to remove end point mappings in which multiple service access points are mapped to a same infra end point node.

In any of the disclosed embodiments, at least one of the service graph updater, the resource graph updater, and the end-to-end mappings creator may include a plurality of microservice instances that operate in parallel to perform respective subsets of the operations of the microservice.

In any of the disclosed embodiments, the respective subsets of operations into which the operations of a given microservice are partitioned may be dependent on the functionality of the given microservice.

In any of the disclosed embodiments, in the service graph, the first service links between consecutive ones of the first plurality of service functions may be unidirectional links and, in the resource graph, the first infra links between pairs of connected ones of the first physical network resources may be bidirectional links.

In any of the disclosed embodiments, the service function chain mapping system may further include, for at least one of the service graph updater, the resource graph updater, and the end-to-end mappings creator, an alternate microservice that performs at least one of the functions of the respective microservice differently than does the respective microservice.

BRIEF DESCRIPTION OF THE DRAWINGS

For a more complete understanding of the present invention and its features and advantages, reference is now made to the following description, taken in conjunction with the accompanying drawings, in which:

FIG. 8 is a block diagram illustrating selected elements of a system for mapping service function chains to physical network resources using multiple microservices, according to some embodiments;

FIGS. 9A and 9B illustrates example mappings between two different service graphs and a single resource graph, according to some embodiments;

FIGS. 11A and 11B illustrate two different example mappings between a single service graph and a single resource graph, respectively, according to some embodiments, according to some embodiments;

DESCRIPTION OF THE EMBODIMENT(S)

Figure 1:
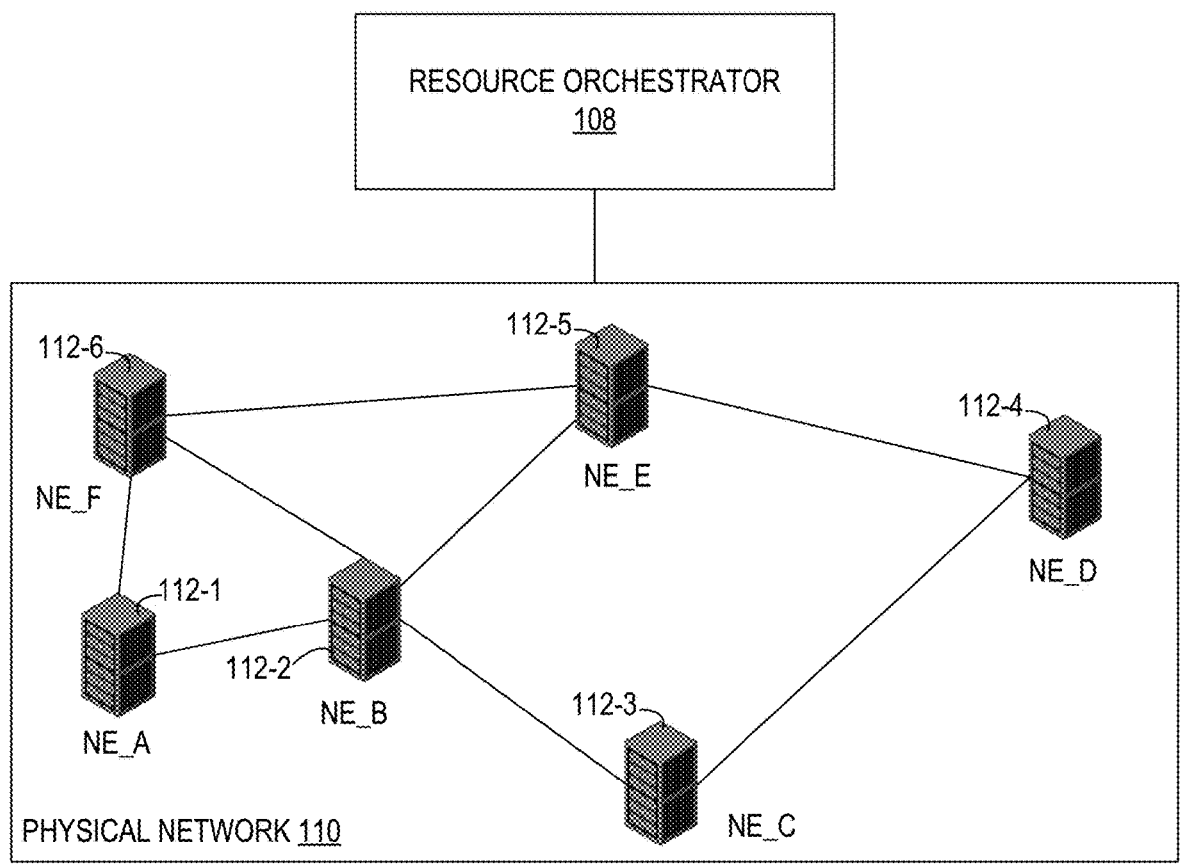
FIG. 1 illustrates selected elements of a network virtualization system, according to at least some embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As noted above, most existing SDN/NFV platforms support only manual service function chaining or service function chaining with a very limited amount of automation. Full automation involves the joint consideration of both network function placements and path calculations during the mapping process, which can be extremely challenging. As will be described herein, a scalable service function chain mapping system may apply a microservice concept in that various steps in a service function chain mapping workflow may be divided into multiple modular micro-steps, each of which is implemented as an individual microservice. Unlike in some distributed orchestration approaches to service function chain mapping, the systems described herein may assume that complete resource graph information is available to compute all feasible service function chain mappings. Unlike some existing SFC mapping solutions, the systems described herein may support the mapping of multiple virtual network functions (VNFs) or other service functions (SFs) onto one physical device, in some embodiments.

In at least some embodiments, each microservice may operate on inputs as they are received (e.g., from a client or a user of the service function chain mapping system or from one or more upstream microservices) and may pass its outputs to one or more subsequent microservices, or back to the client or user on whose behalf the mapping is being performed, once they are generated. In some embodiments, inputs (e.g., service function chain requests and resource information) may be received as streams of inputs, each of which may trigger processing by a series of microservices that individually operate in parallel but also interact with each to collectively create a stream of corresponding outputs (e.g., collections of candidate mapping solutions).

In at least some embodiments, the use of modular microservice instances to perform respective service function chain mapping steps may facilitate the rapid integration of support for new requirements or constraints in the service function chain mapping system, e.g., by extending, modifying, and/or replacing the microservices corresponding to particular micro-steps. For example, in some embodiments, a microservice that performs service graph generation, resource graph generation, or the creation of candidate mapping solutions may be replaced with an alternate microservice that performs at least one of the functions of the respective microservice differently than before based on new requirements or constraints on the system. For example, an alternate microservice for pruning and ranking candidate mapping solutions may be swapped into the system to support a new link bandwidth constraint. In another example, an alternate microservice for generating resource graphs may be swapped into the system to fulfill a new requirement to support multi-cloud service function chaining. In general, by using service graphs to represent logical service function chain requests and resource graphs to represent physical resources and physical network topologies (rather than more traditional chain structures), the systems described herein may be able to support any virtual and/or physical topological properties associated with a given service function chain mapping operation.

Turning now to the drawings, FIG. 1 illustrates selected elements of a network virtualization system, according to at least some embodiments. More specifically, FIG. 1 illustrates an example embodiment of a virtualization system 100 including multiple individual network elements (NE) in a physical network 110 and a resource orchestrator 108. In some embodiments, physical network 110 may be an underlying optical network, such as an optical transport network (OTN) or a flexible optical data plane (e.g., flexible transceivers) configured to adjust the bandwidth of connections.

In FIG. 1, resource orchestrator 108 may manage or coordinate the use of resources within network virtualization system 100, shown comprising multiple network elements 112. Network elements 112 may represent various types of network functionality, such as switches, routers, etc., and may include hardware to interconnect various types of physical interfaces. System 100 comprises network element NE_A 112-1, network element NE_B 112-2, network element NE_C 112-3, network element NE_D 112-4, network element NE_E 112-5, and network element NE_F 112-6, along with connections between the network elements that may have different distances and different properties. In some embodiments, system 100 may represent a network topology for a single network domain, the use of whose resources are coordinated by resource orchestrator 108. Note that, in some embodiments, various network management functions for system 100 other than those provided by resource orchestrator 108 may be provided by a dedicated SDN controller (not shown). When larger networks include multiple network domains, each individual network domain may be managed by a respective SDN controller or resource orchestrator, or a single SDN controller or resource orchestrator may manage multiple network domains.

As previously noted, network function virtualization (NFV) may be used to virtualize network functions and migrate them from devices that are built for a single, specific purpose to multi-purpose virtual machines on commercial off-the-shelf servers, which may reduce service deployment costs and improve service flexibility. In systems that implement NFV, in order to provide an end-to-end network service, virtual network functions (VNFs) may need to be invoked in a sequential order, referred to as a service function chain (SFC). Service function chaining may involve configuring and/or allocating various virtual machines (VMs) to run these virtualized network functions, and may also involve steering traffic across one or more networks. For example, a traffic flow may be steered through a number of virtual network functions (VNFs) or service functions (SFs) in a specific order based on the service provider's policies and/or on user preferences. In some embodiments, a network service may span across multiple networks such as consumer broadband, mobile backhaul, mobile packet core, and/or virtual private networks (including, e.g., networks implemented on the 1Finity™ platform from Fujitsu Network Communications Inc.).

As disclosed in further detail herein, in some embodiments, multiple microservices implemented within a resource orchestrator 108 and/or an SDN controller may work collaboratively to generate candidate solutions for mapping a service function chain to physical network resources (e.g., various network elements 112) in physical network 110. One or more instances of each of the microservices may operate in parallel to generate candidate mapping solutions in real time (or near real time) in response to receiving new or updated service function chain requests and/or initial or updated information about network resources available for satisfying service chain function requests. In other embodiments, generating candidate solutions for mapping a service function chain to physical network resources in one or more network domains may be performed as a service (e.g., by microservices of a cloud-based service function chain mapping service) on behalf of a resource orchestrator, SDN controller, or other network element in response to a service chain mapping request.

Figure 2:
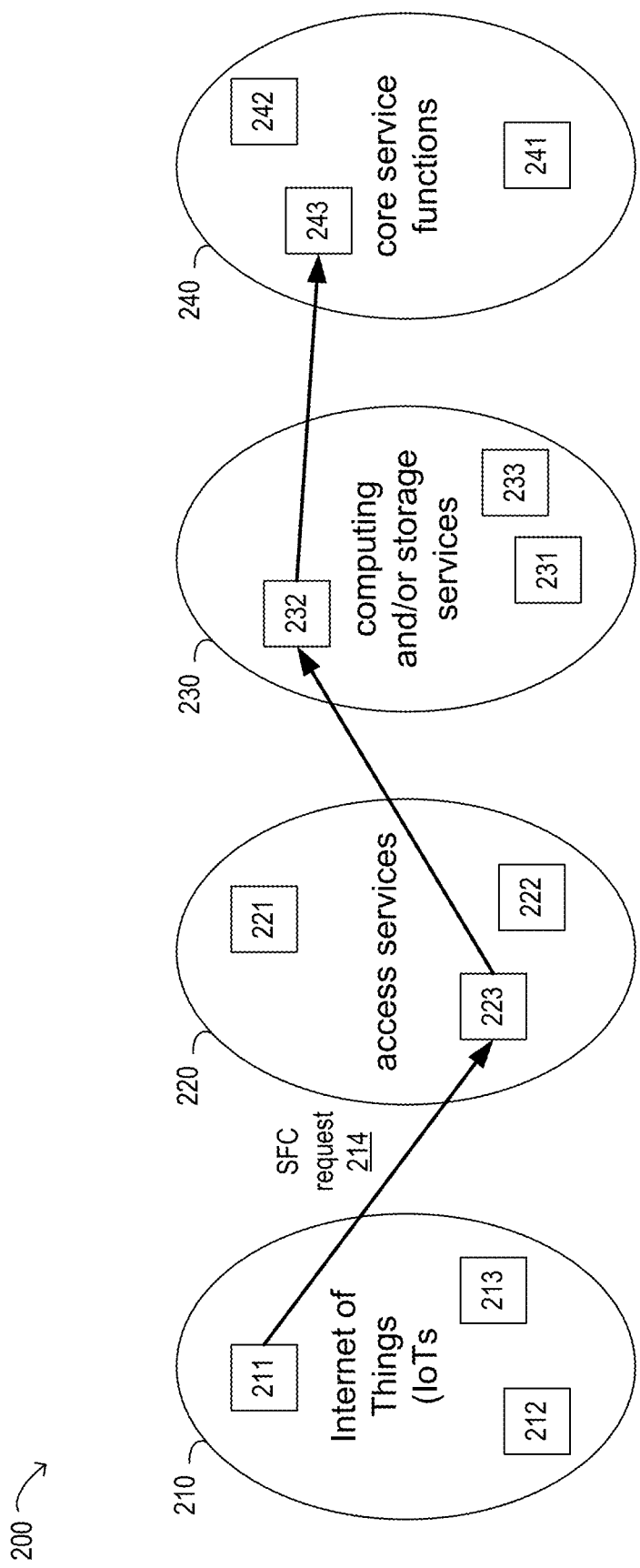
FIG. 2 is a block diagram illustrating selected elements of a multi-domain network for providing end-to-end services, according to one embodiment.

FIG. 2 is a block diagram illustrating selected elements of a multi-domain network for providing end-to-end services, according to one embodiment. In this example embodiment, multi-domain network 200 includes four domains, shown as domains 210, 220, 230, and 240. Each of these domains may include one or more nodes (vertices), at least some of which may implement one or more service functions using the resources within that domain. In this example, the first domain, domain 210, represents the Internet of Things (IoTs), various devices of which may issue service function chain requests. Three such devices are illustrated in FIG. 2 as devices 211, 212, and 213, although any number of devices may be included in domain 210, in different embodiments. In this example embodiment, the second domain, domain 220, represents one or more data centers or other entities that provide access services that may be included in a service function chain. Three such services are illustrated in FIG. 2 as services 221, 222, and 223, although any number of devices may be included in domain 220, in different embodiments.

In this example embodiment, the third domain, domain 230, represents one or more data centers or other entities that provide computing and/or storage services that may be included in a service function chain. Three such services are illustrated in FIG. 2 as services 231, 232, and 233, although any number of devices may be included in domain 230, in different embodiments. In this example embodiment, the fourth domain, domain 240, represents one or more data centers or other entities that provide core service functions that may be included in a service function chain. Three such services are illustrated in FIG. 2 as core service functions 241, 242, and 243, although any number of devices may be included in domain 240, in different embodiments.

In the example illustrated in FIG. 2, device 211 within domain 210 has issued a service function chain request 214, which includes at least one access service, one computing or storage service, and one core service function. More specifically, service function chain request 214 specifies a service function chain that includes an access service function 223 (which is available on one of the nodes/vertices within domain 220), a computing or storage service function 232 (which is available on one of the nodes/vertices within domain 230), and a core service function 243 (which is available on one of the nodes/vertices within domain 240).

As described in detail herein, in various embodiments, the systems and methods described herein for performing service function chain mapping may use multiple microservices operating in parallel to perform different mapping steps. These systems and methods may be used, for example, to chain together multiple (virtual) network service functions (e.g., firewalls, DPI service functions, routers, VPN service functions, intrusion detection system (IDS) service functions, anti-virus service functions, parental controls, and/or other types of service functions) along a traffic forwarding path referred to as a service function chain for providing end-to-end network services.

Figure 3:
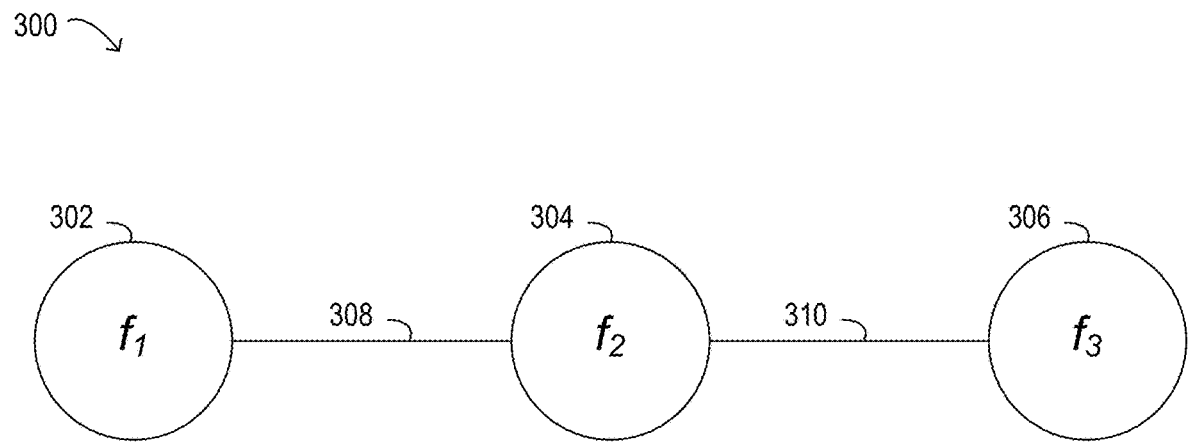
FIG. 3 depicts an abstraction of an example SFC request, according to one embodiment.

FIG. 3 depicts an abstraction of an example SFC request 300, according to one embodiment. In this example, to satisfy SFC request 300, the service function chain mapping system may need to identify a first physical network resource (shown as 302) that can perform a first service function, $f_1$; a second physical network resource (shown as 304) that can perform a second service function, $f_2$; and a third physical network resource (shown as 306) that can perform a third service function, $f_3$. In addition, the SFC request may specify a first set of link requirements 308 (e.g., bandwidth and/or delay requirements) between the node 302 that performs function $f_1$ and the node 304 that performs function $f_2$, and a second set of link requirements 310 (e.g., bandwidth and/or delay requirements) between the node 304 that performs function $f_2$ and the node 306 that performs function $f_3$.

In contrast to other types of virtual network requests, SFC requests may include two unique characteristics: they may be more linear in topology, and they may be flexible in terms of the order in which the service functions are executed, in some cases. Based on these characteristics of SFC requests, the distributed algorithm described herein may apply a vertex-centric distributed computing approach to solve service function chaining in multi-domain networks. In some embodiments, multiple service functions in an SFC can be mapped to a single physical node.

Figures 4A, 4B:
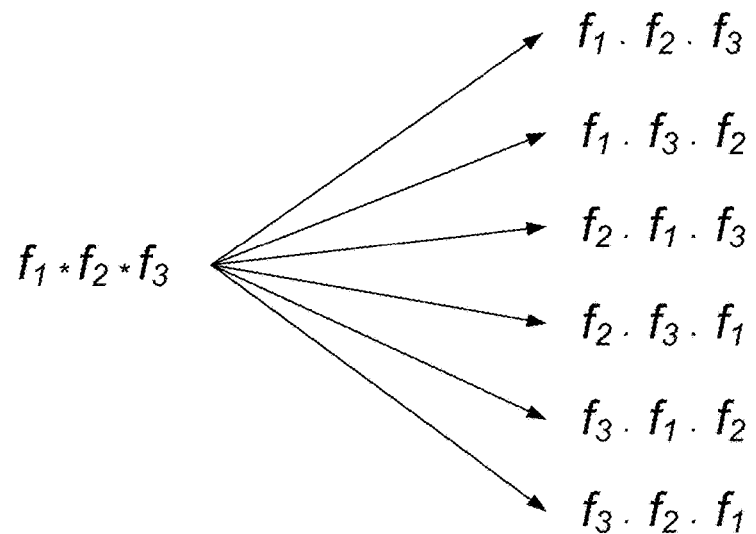
FIGS. 4A and 4B illustrate an example mapping between an SFC request specifying a flexible-ordered service function chain and six possible fixed-ordered chains, any of which, if found, would satisfy this request, according to one embodiment.

FIGS. 4A and 4B illustrate an example mapping between an SFC request specifying a flexible-ordered service function chain, $f_1 * f_2 * f_3$ (shown in FIG. 4A) and six possible fixed-ordered chains, any of which, if found, would satisfy this request. These six fixed-ordered chains are shown in FIG. 4B as $f_1 \cdot f_2 \cdot f_3$, $f_1 \cdot f_3 \cdot f_2$, $f_2 \cdot f_3$, $f_2 \cdot f_3 \cdot f_1$, $\Theta_3 \cdot f_1 f_2$, and $f_3 \cdot f_2 \cdot f_1$. In these figures, the symbol "*" between functions denotes a flexible ordering and the symbol "•" between functions denotes a fixed order.

Figure 5:
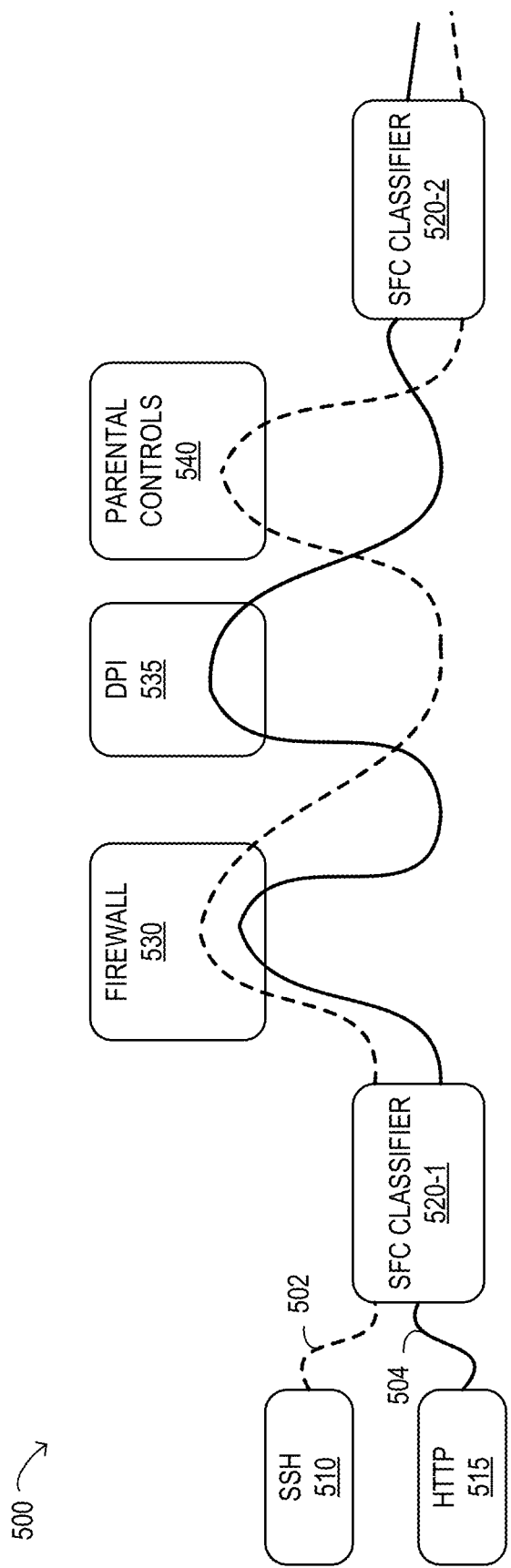
FIG. 5 a block diagram depicting abstractions of two example SFC requests, each including multiple network service functions, according to one embodiment.

FIG. 5 is a block diagram 500 depicting abstractions of two example SFC requests, each including multiple network service functions, according to one embodiment. Three network service functions are shown as firewall function 530, DPI function 535, and parental controls function 540. In FIG. 5, a first SFC request represented as path 502 originates with a secure shell (SSH) 510 (as a first service access point) and is received by SFC classifier 520-1 for mapping to available network resources. The first SFC request 502 includes service functions firewall 530 and parental controls 540, and a second SFC classifier 520-2. In FIG. 5, a second SFC request represented as path 504 originates with Hypertext Transfer Protocol (HTTP) 515 (as a second service access point) and is received by SFC classifier 520-1 for mapping to available network resources. The second SFC request 504 includes service functions firewall 530 and DPI 535, and the second SFC classifier 520-2.

In at least some embodiments, the service function chain mapping systems described herein may include circuitry or logic to perform the following SFC mapping operations:
  generating resource graphs based on current physical resource conditions, e.g., network topology, individual device capabilities and capacities
  generating service graphs based on SFC requests received from, or on behalf of users
  generating end point mapping patterns
  generating infra node mapping patterns
  combining end point mapping patterns and infra node mapping patterns to generate end-to-end candidate mapping solutions
  generating valid SFC mapping solutions by pruning and ranking candidate mapping solutions based on various requirements and constraints.

These operations may be implemented as individual microservices, instances of which operate in parallel and interact with each other to generate and update the best possible mapping solutions for mapping service function chains to network resources in real time.

In at least some embodiments, a service graph updater microservice may receive service function information, e.g., SFC requests specifying combinations and/or sequences of service functions including firewalls, DPI service functions, routers, VPN service functions, intrusion detection system (IDS) service functions, anti-virus service functions, parental controls, and/or other types of service functions, and may create (and subsequently update) a corresponding service graph. A resource graph updater microservice may receive resource information, e.g., information indicating the configurations or capabilities of particular physical network devices, and may create (and subsequently update) a corresponding resource graph. In at least some embodiments of the service chain mapping systems described herein, it may be assumed that information describing a global network topology and information about all nodes in the network are available to the service chain mapping system.

The standard terms and abbreviations shown below are used extensively in the descriptions that follow:
  In reference to the elements within service graphs:
  SAP: Service Access Point
  SF: Service Function
  SL: Service Link
  In reference to the elements within resource graphs:
  IEP: Infra End Point
  IN: Infra Node
  IL: Infra Link In the descriptions that follow, it is assumed that the infra end points to which respective service access points are mapped are present in each candidate mapping solution in a fixed order, while the infra nodes may be present in different candidate mapping solutions in any order.

Figure 6A:
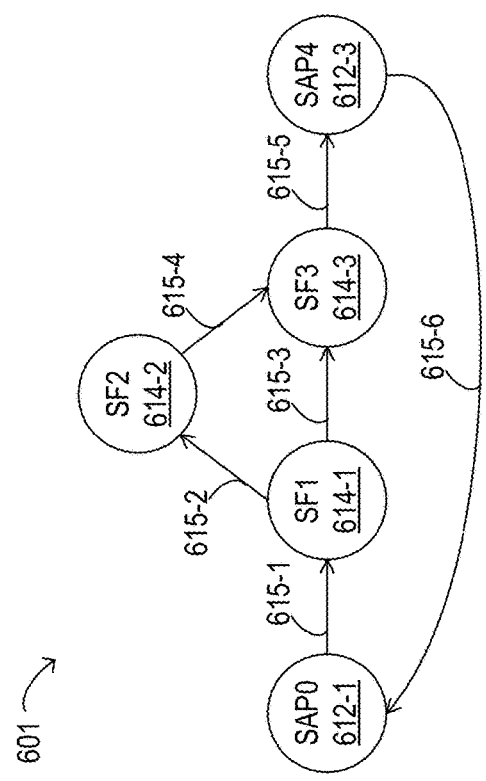
FIGS. 6A and 6B illustrate example service graphs, according to certain embodiments.
Figure 6B:
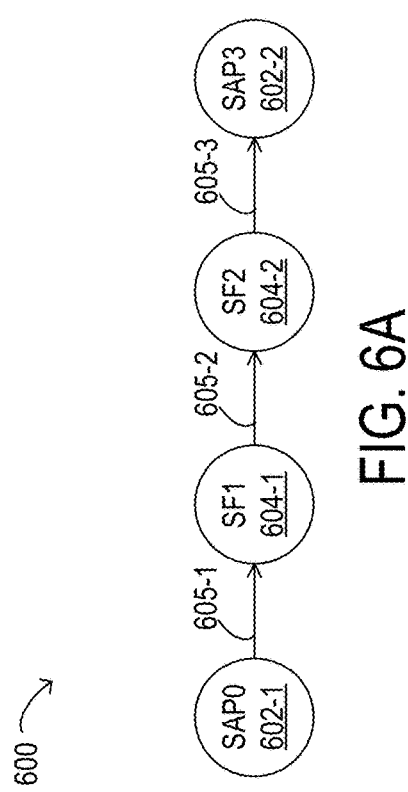

FIGS. 6A and 6B illustrate example service graphs created by a service graph updater microservice, according to certain embodiments. As illustrated in these examples, the service graphs created by a service graph updater microservice may include unidirectional connections between the service functions. In some embodiments, multiple service graphs may be created for service function chain requests in which the order of the service functions is flexible. For example, a different service graph may be created for each possible sequence of service functions. FIG. 6A illustrates a first service graph 600 including a first service access point SAP0 (602-1), two service functions shown as SF1 (604-1) and SF2 (604-2) and a second access point SAP3 (602-2). A first service link SL0 between SAP0 (602-1) and SF1 (604-1) is shown as 605-1. A second service link SL1 between SF1 (604-1) and SF2 (604-2) is shown as 605-2. A third service link SL2 between SF2 (604-2) and SAP3 (602-2) is shown as 605-3.

FIG. 6B illustrates a second service graph 601 including a first service access point SAP0 (612-1), three service functions shown as SF1 (614-1), SF2 (614-2), and SF3 (614-3) and a second access point SAP4 (612-3). A first service link SL0 between SAP0 (612-1) and SF1 (614-1) is shown as 615-1. A second service link SL1 between SF1 (614-1) and SF2 (614-2) is shown as 615-2. A third service link SL2 between SF1 (614-1) and SF3 (614-3) is shown as 615-3. A fourth service link SL3 between SF2 (614-2) and SF3 (614-3) is shown as 615-4. A fifth service link SL4 between SF3 (614-3) and SAP4 (612-3) is shown as 615-5. Finally, a sixth service link SL5 between SAP4 (612-3) and SAP0 (612-1) is shown as 615-6.

Figure 7A:
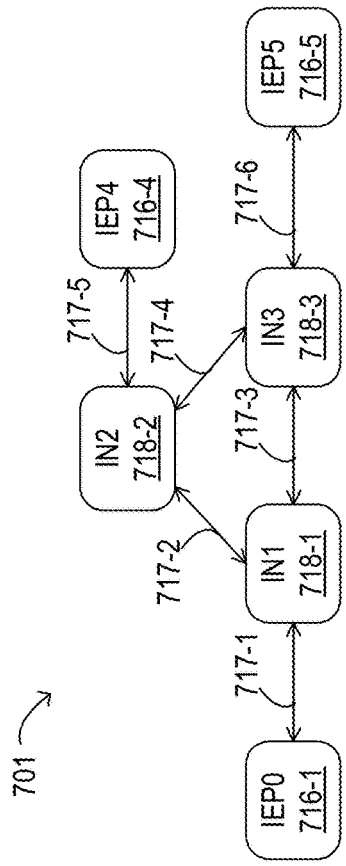
FIGS. 7A and 7B illustrate example resource graphs, according to certain embodiments.
Figure 7B:
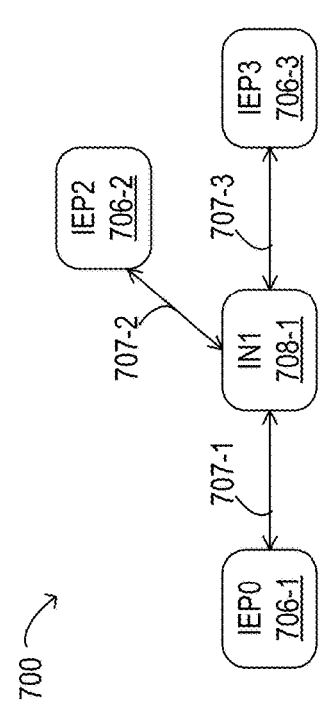

FIGS. 7A and 7B illustrate example resource graphs created by a resource graph updater microservice, according to certain embodiments. As illustrated in these examples, the resource graphs created by a resource graph updater microservice may include bidirectional connections between the physical network resources. More specifically, FIG. 7A illustrates a first resource graph 700 including a first infra end point IEP0 (706-1), a second infra end point IEP2 (706-2), a third infra end point IEP3 (706-3), and one infra node IN1 (708-1). A first infra link IL0 between IEP0 (706-1) and IN1 (708-1) is shown as 707-1. A second infra link IL1 between IN1 (708-1) and IEP2 (706-2) is shown as 707-2. A third infra link IL2 between IN1 (708-1) and IEP3 (706-3) is shown as 707-3.

FIG. 7B illustrates a second resource graph 701 including a first infra end point IEP0 (716-1), a second infra end point IEP4 (716-4), a third infra end point IEP5 (716-5). Resource graph 701 also includes a first infra node IN1 (718-1), a second infra node IN2 (718-2), and a third infra node IN3 (718-3). A first infra link IL0 between IEP0 (716-1) and IN1 (718-1) is shown as 717-1. A second infra link IL1 between IN1 (718-1) and IN2 (718-2) is shown as 717-2. A third infra link IL2 between IN1 (718-1) and IN3 (718-3) is shown as 717-3. A fourth infra link IL3 between IN2 (718-2) and IN3 (718-3) is shown as 717-4. A fifth infra link IL4 between IN2 (718-2) and IEP4 (716-4) is shown as 717-5. A sixth infra link IL5 between IN3 (718-3) and IEP5 (716-5) is shown as 717-6.

FIG. 8 is a block diagram illustrating selected elements of a system 800 for mapping service function chains to physical network resources using multiple microservices, according to some embodiments. In operation, service function chain mapping system 800, using multiple microservices operating in parallel, generates and outputs one or more service function chain mapping solutions 840 based on the received inputs.

In the illustrated example, the microservices in service function chain mapping system 800 include a service graph updater 810 and a resource graph updater 820. As described above, service graph updater 810 may be configured to continuously receive service function information 802 (e.g., as a stream of SFC requests, each specifying combinations and/or sequences of service functions) and to create (and subsequently update) a corresponding service graph. Resource graph updater 820 may be configured to continuously receive resource information (e.g., as a stream of resource information inputs, each indicating the configurations or capabilities of particular physical network devices), and to create (and subsequently update) a corresponding resource graph.

In the illustrated example, the microservices in service function chain mapping system 800 also include an end point mappings creator 815, which may be configured to generate all possible candidate mappings from service access points (SAPs) in a service graph to infra end point nodes (IEPs) in a resource graph. In some embodiments, the end point mappings creator 815 may use a Cartesian product approach to generate the candidate mappings. However, any other suitable approach for generating all possible candidate mappings may be used, in other embodiments. In some embodiments, the end point mappings creator 815 may (optionally) also be configured to prune the resulting end point mappings to avoid mapping multiple SAPs to the same IEP. In other embodiments, it may be possible to map multiple SAPs to the same IEP. Service function chain mapping system 800 also includes an infra node mappings creator 825, which may be configured to generate all possible candidate mappings from the service function (SFs) in a service graph to the infra nodes (INs) in a resource graph. In some embodiments, the infra node mappings creator 825 may use a Cartesian product approach to generate the candidate mappings. However, any other suitable approach for generating all possible candidate mappings may be used, in other embodiments.

Service function chain mapping system 800 also includes an end-to-end mappings creator 830, which may be configured to generate all possible candidate solutions for mapping a service chain request to physical network resources by combining the outputs from end point mappings creator 815 and the outputs from infra node mappings creator 825.

As illustrated in FIG. 8, service function chain mapping system 800 includes mappings pruner and ranker 835, which may be configured to prune and rank valid candidate solutions for mapping a service chain request to physical network resources, as described herein, and to output one or more valid mapping solutions 840. For example, based on various constraints, such as total path cost, hop count, total delay, network function cost, or other constraints, pruner and ranker 835 may be configured to remove candidate mapping solutions that fail to meet certain predefined requirements or constraints and/or to rank candidate mapping solutions from most suitable to least suitable based on such requirements or constraints.

In at least some embodiments, as the information received as inputs 802 and 804 changes, microservices 810, 815, 820, 825, 830, and 835 may operate in parallel (e.g., in real time) to re-generate and output updated mapping solutions 840 in light of the changes.

FIGS. 9A and 9B illustrate example mappings between two different service graphs and a single resource graph, according to some embodiments. More specifically, FIG. 9A illustrates an example mapping 900 between service graph 600 illustrated in FIG. 6A and resource graph 700 illustrated in FIG. 7A. Note that since resource graph 700 includes only one infra node (shown as IN1, 708-1), both of the service functions 604 in service graph 600 must be mapped to this node. However, there are three infra end point nodes 706 to which the two service access points 602 can be mapped. In this example, there are a total of six possible mapping patterns, all of which are shown below:

mappingPattern[0]: {SAP0=IEP0, SAP3=IEP2, SF1=IN1, SF2=IN1}
mappingPattern[1]: {SAP0=IEP0, SAP3=IEP3, SF1=IN1, SF2=IN1}
mappingPattern[2]: {SAP0=IEP2, SAP3=IEP0, SF1=IN1, SF2=IN1}
mappingPattern[3]: {SAP0=IEP2, SAP3=IEP3, SF1=IN1, SF2=IN1}
mappingPattern[4]: {SAP0=IEP3, SAP3=IEP0, SF1=IN1, SF2=IN1}
mappingPattern[5]: {SAP0=IEP3, SAP3=IEP2, SF1=IN1, SF2=IN1}

FIG. 9B illustrates an example mapping 901 between service graph 601 illustrated in FIG. 6B and resource graph 700 illustrated in FIG. 7A. Note that since resource graph 700 includes only one infra node (shown as IN1, 708-1), all three service functions 604 in service graph 601 must be mapped to this node. However, there are three infra end point nodes 706 to which the two service access points 602 can be mapped. In this example, there are a total of six possible mapping patterns, all of which are shown below:

mappingPattern[0]: {SAP0=IEP0, SAP4=IEP2, SF1=IN1, SF2=IN1, SF3=IN1}
mappingPattern[1]: {SAP0=IEP0, SAP4=IEP3, SF1=IN1, SF2=IN1, SF3=IN1}
mappingPattern[2]: {SAP0=IEP2, SAP4=IEP0, SF1=IN1, SF2=IN1, SF3=IN1}
mappingPattern[3]: {SAP0=IEP2, SAP4=IEP3, SF1=IN1, SF2=IN1, SF3=IN1}
mappingPattern[4]: {SAP0=IEP3, SAP4=IEP0, SF1=IN1, SF2=IN1, SF3=IN1}
mappingPattern[5]: {SAP0=IEP3, SAP4=IEP2, SF1=IN1, SF2=IN1, SF3=IN1}

Figure 10B:
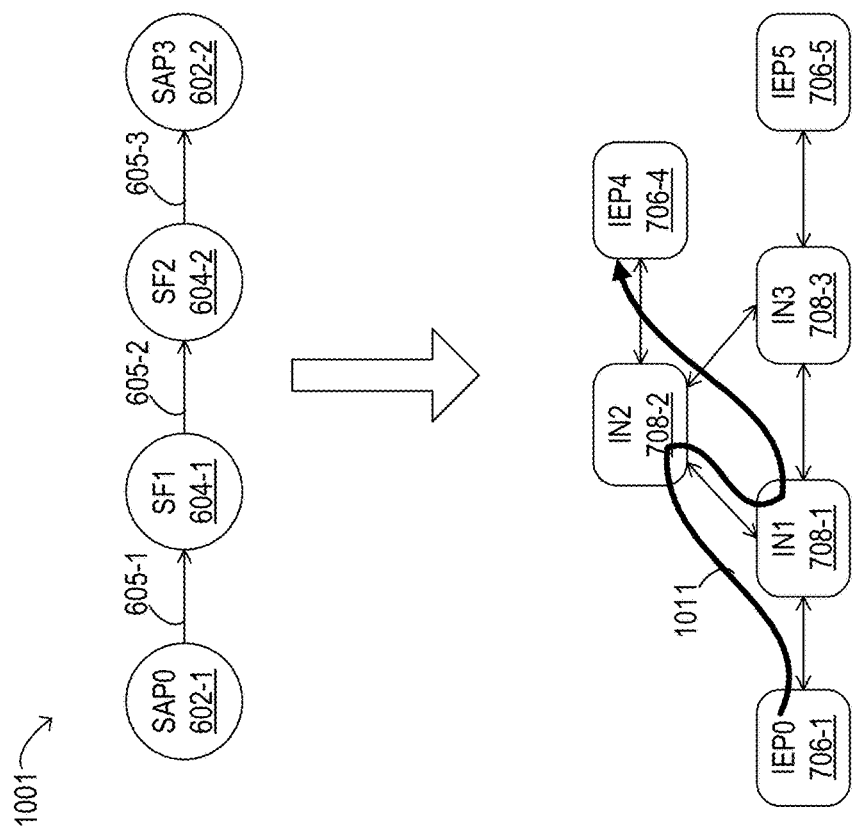
FIGS. 10A and 10B illustrate two different example mappings between a single service graph and a single resource graph, respectively, according to some embodiments.
Figure 10A:
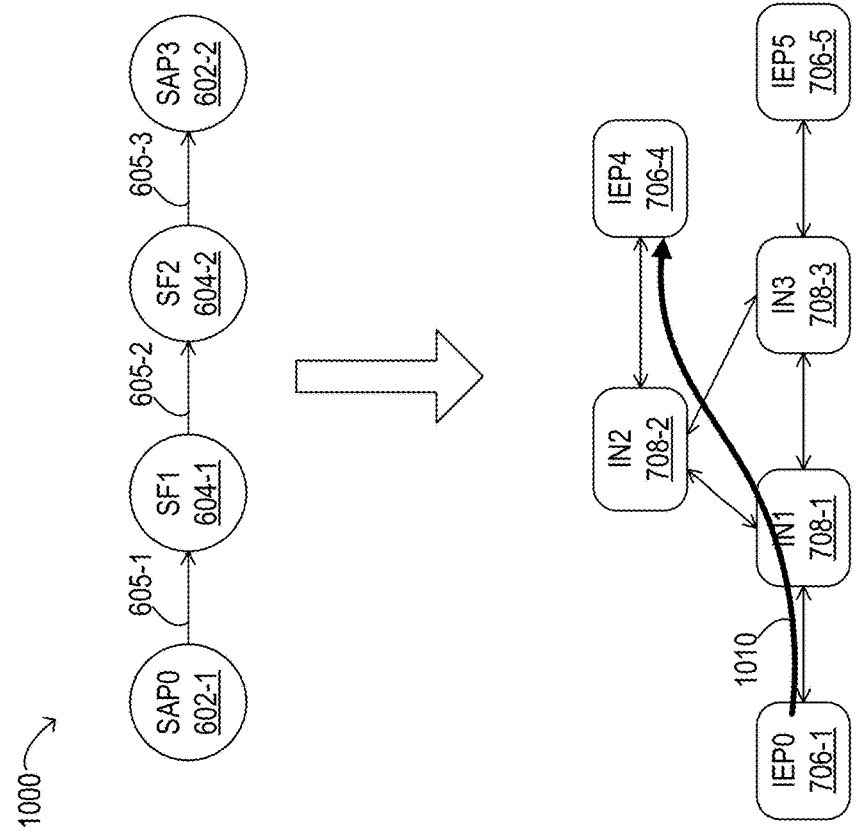

FIGS. 10A and 10B illustrate two different example mappings between a single service graph (service graph 600 illustrated in FIG. 6A) and a single resource graph (resource graph 701 illustrated in FIG. 7B), respectively, according to some embodiments. More specifically, FIG. 10A illustrates a best case mapping between service graph 600 and resource graph 701 and FIG. 10B illustrates a worst case mapping between service graph 600 and resource graph 701, based on their respective overall SFC path distances. In this case, resource graph 701 includes three infra nodes 708 to which the two service function 604 can be mapped, and three infra end point nodes 706 to which the two service access points 602 can be mapped. Therefore, there are a total of 54 possible mapping patterns, including the following mapping patterns:

mappingPattern[0]: {SAP0=IEP0, SAP3=IEP4, SF1=IN1, SF2=IN1}
mappingPattern[1]: {SAP0=IEP0, SAP3=IEP4, SF1=IN1, SF2=IN2}
mappingPattern[2]: {SAP0=IEP0, SAP3=IEP4, SF1=IN1, SF2=IN3}
mappingPattern[3]: {SAP0=IEP0, SAP3=IEP4, SF1=IN2, SF2=IN1}
mappingPattern[4]: {SAP0=IEP0, SAP3=IEP4, SF1=IN2, SF2=IN2}
mappingPattern[5]: {SAP0=IEP0, SAP3=IEP4, SF1=IN2, SF2=IN3}
mappingPattern[6]: {SAP0=IEP0, SAP3=IEP4, SF1=IN3, SF2=IN1}
mappingPattern[7]: {SAP0=IEP0, SAP3=IEP4, SF1=IN3, SF2=IN2}
mappingPattern[8]: {SAP0=IEP0, SAP3=IEP4, SF1=IN3, SF2=IN3}
mappingPattern[9]: {SAP0=IEP0, SAP3=IEP5, SF1=IN1, SF2=IN1}
mappingPattern[10]: {SAP0=IEP0, SAP3=IEP5, SF1=IN1, SF2=IN2}
mappingPattern[11]: {SAP0=IEP0, SAP3=IEP5, SF1=IN1, SF2=IN3}
mappingPattern[12]: {SAP0=IEP0, SAP3=IEP5, SF1=IN2, SF2=IN1}
mappingPattern[13]: {SAP0=IEP0, SAP3=IEP5, SF1=IN2, SF2=IN2}
mappingPattern[14]: {SAP0=IEP0, SAP3=IEP5, SF1=IN2, SF2=IN3}
mappingPattern[15]: {SAP0=IEP0, SAP3=IEP5, SF1=IN3, SF2=IN1}
mappingPattern[16]: {SAP0=IEP0, SAP3=IEP5, SF1=IN3, SF2=IN2}
mappingPattern[17]: {SAP0=IEP0, SAP3=IEP5, SF1=IN3, SF2=IN3}
mappingPattern[18]: {SAP0=IEP4, SAP3=IEP0, SF1=IN1, SF2=IN1}
. . .

FIG. 10A illustrates a first mapping 1000 (e.g., a best case mapping) between service graph 600 illustrated in FIG. 6A and resource graph 701 illustrated in FIG. 7B. In this example mapping, SAP0 (602-1) is mapped to IEP0 (706-1), SF1 (604-1) is mapped to IN1 (708-1), SF2 (604-2) is also mapped to IN1 (708-1), and SAP3 (602-2) is mapped to IEP4 (706-4). Since there is no direct path between IN1 (708-1) and IEP4 (706-4), the routing path 1010 for service function chain 600 according to mapping 1000 goes from IEP0 to IN1, to IN2, and then to IEP4, although no service functions are performed at IN2. The distance minDistanceMapping: {SAP0=IEP0, SAP3=IEP4, SF1=IN1, SF2=IN1} for path 1010 may be given as minDistance: 300.0, in this example.

FIG. 10B illustrates a second mapping 1001 (e.g., a worst case mapping) between service graph 600 illustrated in FIG. 6A and resource graph 701 illustrated in FIG. 7B. In this example mapping, SAP0 (602-1) is mapped to IEP0 (706-1), SF1 (604-1) is mapped to IN2 (708-2), SF2 (604-2) is mapped to IN1 (708-1), and SAP3 (602-2) is mapped to IEP4 (706-4). Since there is no direct path between IEP0 (706-1) and IN2 (708-2) and no direct path between IN1 (708-1) and IEP4 (706-4), the routing path 1011 for service function chain 600 according to mapping 1001 goes from IEP0 through IN1 to IN2, back to IN1, and again through IN2 to IEP4. The distance maxDistanceMapping: {SAP0=IEP0, SAP3=IEP4, SF1=IN2, SF2=IN1} for path 1011 may be given as maxDistance: 500.0, in this example.

FIGS. 11A and 11B illustrate two different example mappings between a single service graph (service graph 601 illustrated in FIG. 6B) and a single resource graph (resource graph 701 illustrated in FIG. 7B), respectively, according to some embodiments. More specifically, FIG. 11A illustrates a best case mapping between service graph 601 and resource graph 701 and FIG. 11B illustrates a worst case mapping between service graph 601 and resource graph 701, based on their respective overall SFC path distances. In this case, resource graph 701 includes three infra nodes 708 to which the three service function 604 can be mapped, and three infra end point nodes 706 to which the two service access points 602 can be mapped. Therefore, there are a total of 162 possible mapping patterns, including the following mapping patterns:

mappingPattern[0]: {SAP0=IEP0, SAP4=IEP4, SF1=IN1, SF2=IN1, SF3=IN1}
mappingPattern[1]: {SAP0=IEP0, SAP4=IEP4, SF1=IN1, SF2=IN1, SF3=IN2}
mappingPattern[2]: {SAP0=IEP0, SAP4=IEP4, SF1=IN1, SF2=IN1, SF3=IN3}
mappingPattern[3]: {SAP0=IEP0, SAP4=IEP4, SF1=IN1, SF2=IN2, SF3=IN1}
mappingPattern[4]: {SAP0=IEP0, SAP4=IEP4, SF1=IN1, SF2=IN2, SF3=IN2}
mappingPattern[5]: {SAP0=IEP0, SAP4=IEP4, SF1=IN1, SF2=IN2, SF3=IN3}
mappingPattern[6]: {SAP0=IEP0, SAP4=IEP4, SF1=IN1, SF2=IN3, SF3=IN1}
mappingPattern[7]: {SAP0=IEP0, SAP4=IEP4, SF1=IN1, SF2=IN3, SF3=IN2}
mappingPattern[8]: {SAP0=IEP0, SAP4=IEP4, SF1=IN1, SF2=IN3, SF3=IN3}
mappingPattern[9]: {SAP0=IEP0, SAP4=IEP4, SF1=IN2, SF2=IN1, SF3=IN1}
mappingPattern[10]: {SAP0=IEP0, SAP4=IEP4, SF1=IN2, SF2=IN1, SF3=IN2}
mappingPattern[11]: {SAP0=IEP0, SAP4=IEP4, SF1=IN2, SF2=IN1, SF3=IN3}
mappingPattern[12]: {SAP0=IEP0, SAP4=IEP4, SF1=IN2, SF2=IN2, SF3=IN1}
mappingPattern[13]: {SAP0=IEP0, SAP4=IEP4, SF1=IN2, SF2=IN2, SF3=IN2}
mappingPattern[14]: {SAP0=IEP0, SAP4=IEP4, SF1=IN2, SF2=IN2, SF3=IN3}
mappingPattern[15]: {SAP0=IEP0, SAP4=IEP4, SF1=IN2, SF2=IN3, SF3=IN1}
mappingPattern[16]: {SAP0=IEP0, SAP4=IEP4, SF1=IN2, SF2=IN3, SF3=IN2}
mappingPattern[17]: {SAP0=IEP0, SAP4=IEP4, SF1=IN2, SF2=IN3, SF3=IN3}
mappingPattern[18]: {SAP0=IEP0, SAP4=IEP4, SF1=IN3, SF2=IN1, SF3=IN1}
mappingPattern[19]: {SAP0=IEP0, SAP4=IEP4, SF1=IN3, SF2=IN1, SF3=IN2}
mappingPattern[20]: {SAP0=IEP0, SAP4=IEP4, SF1=IN3, SF2=IN1, SF3=IN3}
mappingPattern[21]: {SAP0=IEP0, SAP4=IEP4, SF1=IN3, SF2=IN2, SF3=IN1}
mappingPattern[22]: {SAP0=IEP0, SAP4=IEP4, SF1=IN3, SF2=IN2, SF3=IN2}
. . .

FIG. 11A illustrates a first mapping 1100 (e.g., a best case mapping) between service graph 601 illustrated in FIG. 6B and resource graph 701 illustrated in FIG. 7B. In this example mapping, SAP0 (602-1) is mapped to IEP0 (706-1), SF1 (604-1), SF2 (604-2), and SF3 (604-3) are all also mapped to IN1 (708-1), and SAP4 (602-3) is mapped to IEP4 (706-4). Since there is no direct path between IN1 (708-1) and IEP4 (706-4), the routing path 1110 for service function chain 601 according to mapping 1100 goes from IEP0 to IN1, to IN2, and then to IEP4, although no service functions are performed at IN2. The distance minDistanceMapping: {SAP0=IEP0, SAP4=IEP4, SF1=IN1, SF2=IN1, SF3=IN1} for path 1110 may be given as minDistance: 300.0, in this example.

FIG. 11B illustrates a second mapping 1101 (e.g., a worst case mapping) between service graph 601 illustrated in FIG. 6B and resource graph 701 illustrated in FIG. 7B. In this example mapping, SAP0 (602-1) is mapped to IEP0 (706-1), SF1 (604-1) is mapped to IN2 (708-2), SF2 (604-2) is mapped to IN1 (708-1), SF3 (604-3) is mapped to IN3 (708-1), and SAP4 (602-3) is mapped to IEP4 (706-4). Since there is no direct path between IEP0 (706-1) and IN2 (708-2), the routing path 1111 for service function chain 601 according to mapping 1101 goes from IEP0 through IN1 to IN2, back to IN1, to IN3, and then to IEP4. The distance maxDistanceMapping: {SAP0=IEP0, SAP4=IEP4, SF1=IN2, SF2=IN1, SF3=IN3} for path 1111 may be given as maxDistance: 600.0, in this example.

Figure 12A:
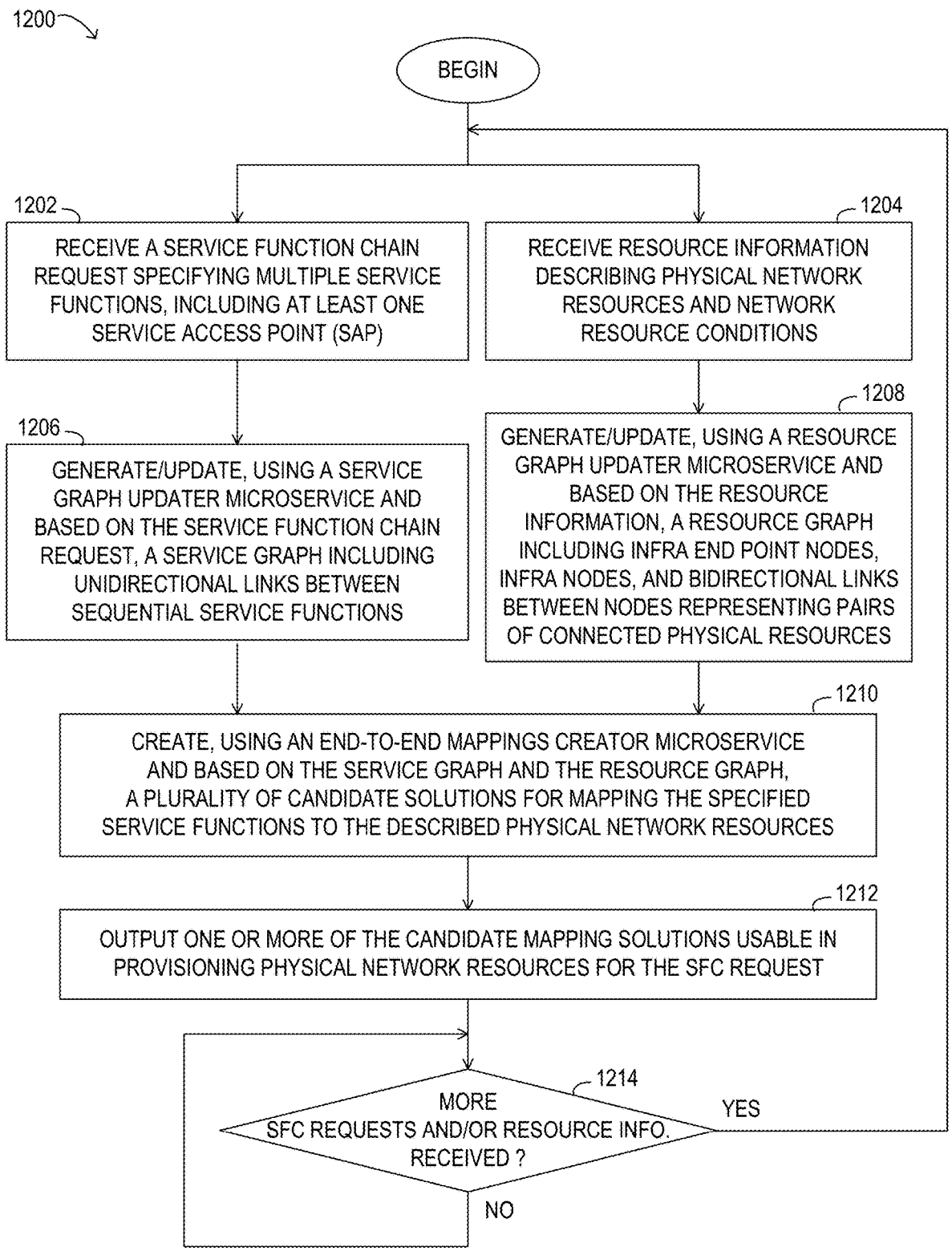
FIG. 12A is a flow diagram illustrating selected elements of an embodiment of a method for generating multiple candidate solutions for mapping a service function chain request to physical network resources.

Referring now to FIG. 12A, a flow chart of selected elements of an embodiment of a method 1200 for generating multiple candidate solutions for mapping a service function chain request to physical network resources, as described herein, is depicted in flowchart form. In various embodiments, some or all of the operations of method 1200 may be performed using one or more microservices implemented as part of a resource orchestrator (such as resource orchestrator 108 illustrated in FIG. 1) or an SDN controller. In other embodiments, some or all of the operations of method 1200 may be performed as a service (e.g., by microservices of a cloud-based service function chain mapping service or end-to-end network service orchestrator) on behalf of a local resource orchestrator, SDN controller, or other network element in response to a service chain mapping request. In particular embodiments, some or all of the operations of method 1200 may be performed collectively by multiple microservices of a service function chain mapping system. It is noted that certain operations described in method 1200 may be optional or may be rearranged in different embodiments.

Method 1200 may begin and, at 1202, may include receiving a service function chain request specifying multiple service functions, including at least one service access point (SAP). At 1206, the method may include generating or updating a service graph based on the service function chain request using a service graph updater microservice. The service graph may include unidirectional links between sequential service functions.

In parallel with the operations shown as 1202 and 1206, method 1200 may include, at 1204, receiving resource information describing physical network resources and network resource conditions and, at 1208, generating or updating a resource graph based on the resource information using a resource graph updater microservice. The resource graph may include infra end point nodes, infra nodes, and bidirectional links between nodes representing pairs of connected physical resources.

As 1210, method 1200 may include creating a plurality of candidate solutions for mapping the specified service functions to the described physical network resources based on the service graph and the resource graph using an end-to-end mappings creator microservice. One example embodiment of a method for creating end-to-end mappings using multiple microservices is depicted in FIG. 12B and described below.

Figure 14:
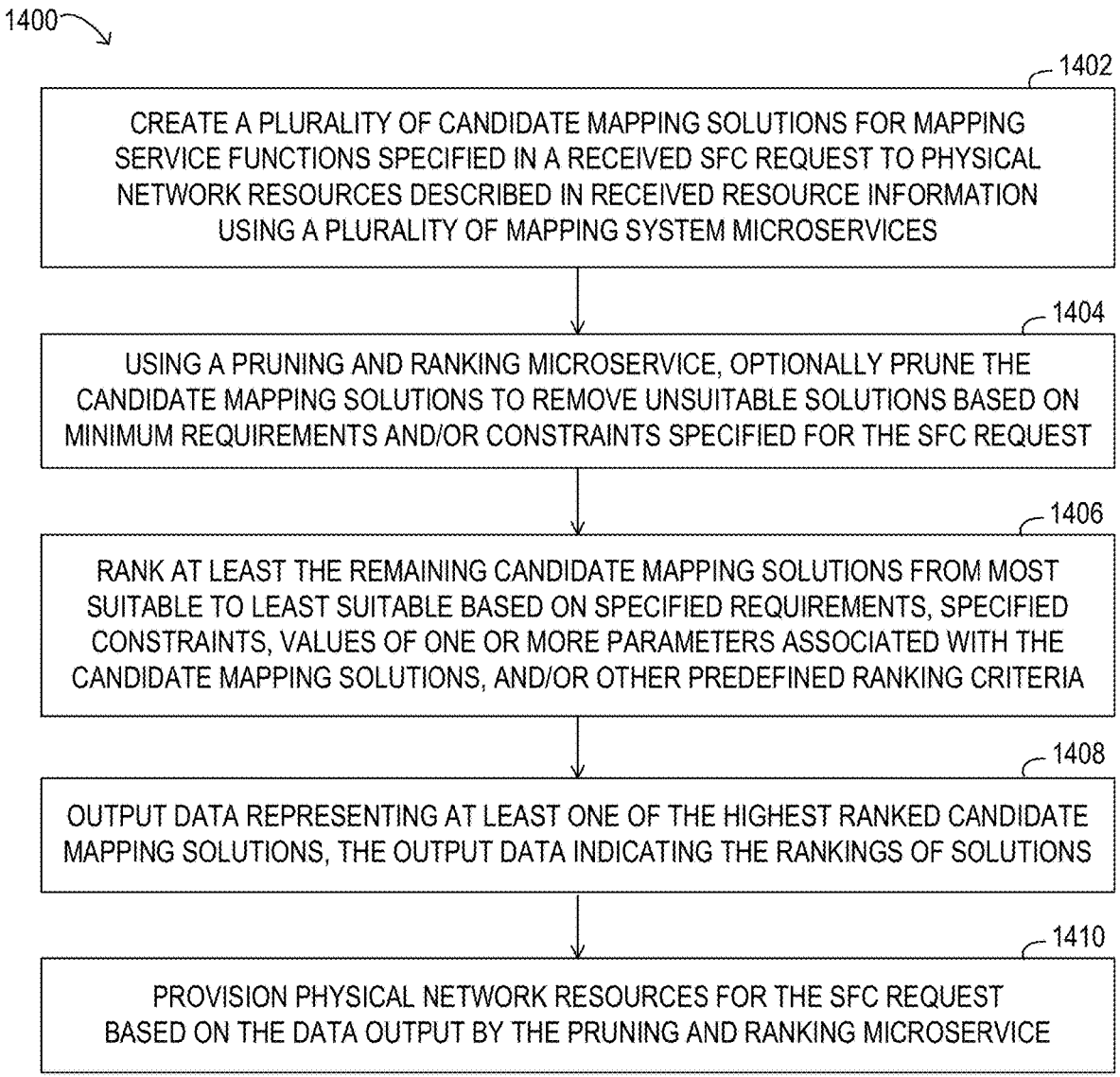
FIG. 14 is a flow diagram illustrating selected elements of an embodiment of a method for pruning and ranking candidate mapping solutions using a mapping system microservice, according to one embodiment.

At 1212, the method may include outputting one or more of the candidate mapping solutions usable in provisioning physical network resources for satisfying the SFC request. For example, in some embodiments, all of the candidate mapping solutions generated at 1210 may be output. In other embodiments, the candidate mapping solutions generated at 1210 may be pruned and/or ranked by another mapping system microservice before a subset of the generated solutions is output. One example embodiment of a method for pruning and ranking candidate mapping solutions using a mapping system microservice is illustrated in FIG. 14 and described below.

In at least some embodiments, the service graph updater, resource graph updater, and end-to-end mappings creator microservices may operate continuously and in parallel to generate additional candidate mapping solutions as new or updated SFC requests are received and/or as updated resource information is received. For example, a user of the service function chain mapping system may submit a series of service function chain requests for mapping. In another example, the physical network resources and/or topology of a physical network may change as network elements are added, removed, or swapped out for different network element types or versions. If, and when, at 1214, new or updated SFC requests are received and/or updated resource information is received, method 1200 may return to 1202 and/or 1204, as appropriate, to begin an SFC mapping operation based on the new or updated inputs.

Figure 12B:
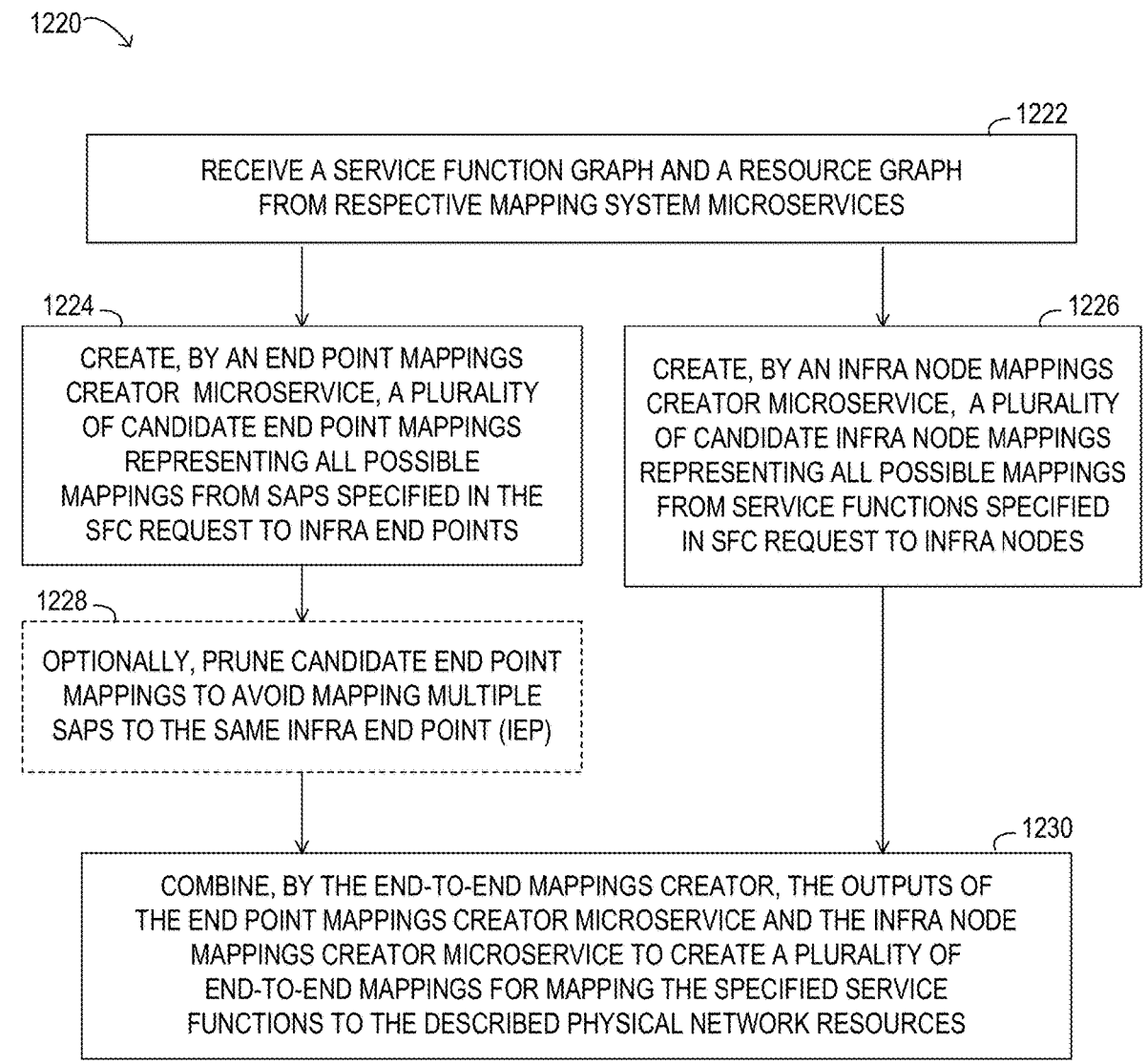
FIG. 12B is a flow diagram illustrating selected elements of an embodiment of a method for creating end-to-end service function chain mappings using multiple microservices.

Referring now to FIG. 12B, a flow chart of selected elements of an embodiment of a method 1220 for creating end-to-end service function chain mappings using multiple microservices, as described herein, is depicted in flowchart form. In various embodiments, some or all of the operations of method 1220 may be performed using one or more microservices implemented as part of a resource orchestrator (such as resource orchestrator 108 illustrated in FIG. 1) or an SDN controller. In other embodiments, some or all of the operations of method 1220 may be performed as a service (e.g., by a microservice of a cloud-based service function chain mapping service or end-to-end network service orchestrator) on behalf of a local resource orchestrator, SDN controller, or other network element in response to a service chain mapping request. In particular embodiments, some or all of the operations of method 1220 may be performed collectively by multiple microservices of a service function chain mapping system. It is noted that certain operations described in method 1220 may be optional or may be rearranged in different embodiments.

Method 1220 may begin, at 1222, by receiving a service graph and a resource graph from respective mapping system microservices (e.g., by a service graph updater microservice and a resource graph updater microservice, respectively). The service graph may include data representing multiple service functions connected by unidirectional links, in accordance with a particular service function chain request. The resource graph may include data representing physical network resources connected by bidirectional links, in accordance with a network topology in which the physical network resources reside. The physical resources may include any number of infra end point nodes and infra nodes, as described above.

The method may include, at 1224, creating, by an end point mappings creator microservice, a plurality of candidate end point mappings representing all possible mappings between service access points specified in the service function chain request (and represented in the service graph) and infra end points represented in the resource graph and, in parallel at 1226, creating, by an infra node mappings creator microservice, a plurality of candidate infra node mappings representing all possible mappings between service functions specified in the service function chain request (and represented in the service graph) and infra nodes represented in the resource graph.

As illustrated in FIG. 12B, method 1220 may, optionally, include the end point mappings creator microservice pruning one or more candidate end point mappings to avoid mapping multiple service access points to the same infra end point (IEP). In other embodiments, it may be possible to map multiple service access points to the same infra end point.

At 1230, the method may include combining, by the end-to-end mappings creator, the outputs of the end point mappings creator microservice (whether or not they have been pruned) and the infra node mappings creator microservice to create a plurality of end-to-end mappings for mapping the specified service functions to the described physical network resources.

In at least some embodiments, the end point mappings creator microservice and the infra node mappings creator microservice may operate continuously and in parallel with the service graph updater, resource graph updater, and end-to-end mappings creator microservices during operation of the service function chain mapping system.

In various embodiments of the present disclosure, once the end-to-end mappings creator microservices identifies candidate mappings solutions for a given service function chain request, a pruning and ranking microservice may process the candidate mapping solutions and output one or more of the solutions to be returned to the client or user on whose behalf the mapping is performed. The client or user may then select one of the returned solutions to be used in provisioning physical network resources to satisfy the given service function chain request based on any suitable criteria. For example, a mapping solution may be selected that best reflects user preferences for resource usage or other policy decisions.

In at least some embodiments, an SFC request may include information specifying any or all of the following request elements, among others: the service functions to be performed, the resources required to perform those service functions (e.g., the required number of virtual machines and/or storage resources), and delay or bandwidth requirements for the links between the nodes on which the different service functions in the chain are to be performed. In some embodiments, an SFC request may also specify parameter values indicating whether or not candidate mapping solutions should be pruned and, if so, specifying one or more requirements or constraints for the SFC request, or other criteria, to be used in performing the pruning, and/or the priority of each of multiple constraints to be applied. For example, the pruning and ranking microservice may be configured to apply multiple types of constraints to the candidate mapping solutions, such as total path cost, hop count, total delay, network function cost, or other constraints. In various embodiments, the path cost for a candidate mapping solution may represent the actual cost of the collection of physical links between the nodes in the candidate mapping solution or may represent another parameter (e.g., path distance, delay or bandwidth) that is considered a "cost" of the solution, in different embodiments.

In some embodiments, an SFC request may include a minimum requirement or an upper limit on one of these constraints and candidate mapping solutions that do not meet the minimum requirement or that exceed the upper limit may be pruned out prior to ranking. In other embodiments, all candidate mapping solutions may be ranked, although not all of them may be output for consideration. In some embodiments, a request to map a service function chain may be submitted to the service function chain mapping system using an application programming interface (API) call that includes options for specifying various requirements and constraints of the mapping, pruning, and ranking operations to be applied.

Figure 13:
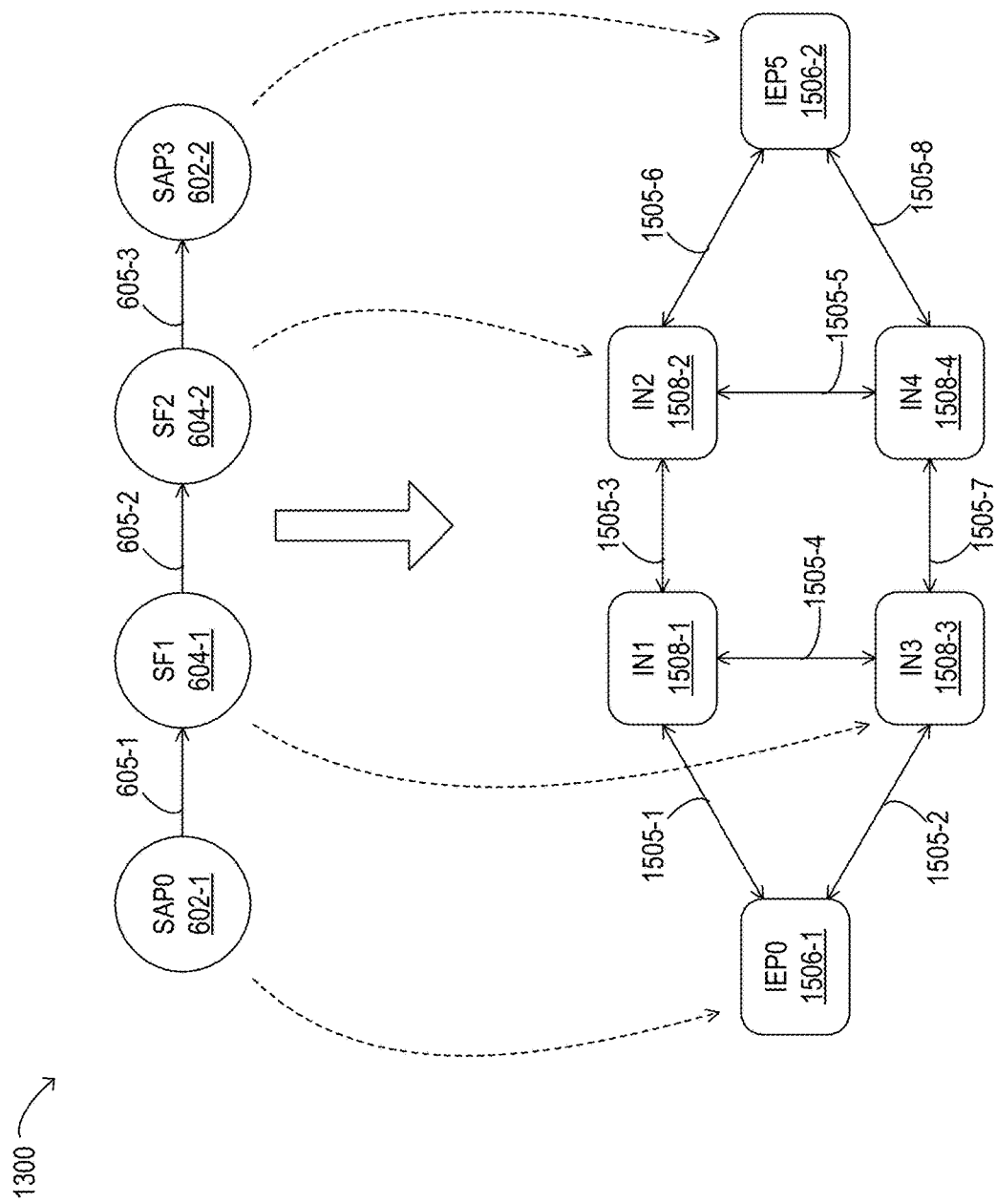
FIG. 13 illustrates an example pruning and ranking operation as applied to a service chain mapping result, according to one embodiment.

FIG. 13 illustrates an example pruning and ranking operation 1300 as applied to a service chain mapping result, according to one embodiment. In the illustrated example, service graph 601 illustrated in FIG. 6B is mapped to a resource graph that includes two infra end points, shown as IEP0 (1506-1) and IEP5 (1506-2), and four infra nodes, shown as IN1 (1508-1), IN2 (1508-2), IN3 (1508-3), and IN4 (1508-4). In this example, for at least two mapping solutions referred to as path A and path B, SAP0 (602-1) has been mapped to IEP0 (1506-1), SF1 (604-1) has been mapped to IN3 (1508-3), SF2 (604-2) has been mapped to IN2 (1508-2), and SAP3 (602-2) has been mapped to IEP5 (1506-2). However, the two mapping solutions include different routing paths through the physical network resources. In this example, the path costs are based on respective costs of the service links between pairs of service functions as mapped to particular physical network resources and the infra links connecting them. More specifically, the cost associated with SL0 (1505-1) between IEP0 and IN1 is 150, the cost associated with SL1 (1505-2) between IEP0 and IN3 is 100, the cost associated with SL2 (1505-3) between IN1 and IN2 is 150, the cost associated with SL3 (1505-4) between IN1 and IN3 is 100, the cost associated with SL4 (1505-5) between IN2 and IN4 is 50, the cost associated with SL5 (1505-6) between IN2 and IEP5 is 50, the cost associated with SL6 (1505-7) between IN3 and IN4 is 50, and the cost associated with SL7 (1505-8) between IN4 and IEP5 is 150.

In this example, the best and worst mappings based on path cost alone are as follows:
(For path A): minPathCostMapping: {SAP0=IEP0, SAP3=IEP5, SF1=IN3, SF2=IN2},
resourceNodePath: [IEP0, IN3, IN4, IN2, IEP5],
pathCost: 250.0,
hopCount: 4
maxPathCostMapping: {SAP0=IEP0, SAP3=IEP5, SF1=IN2, SF2=IN1},
resourceNodePath: [IEP0, IN3, IN4, IN2, IN1, IN2, IEP5],
pathCost: 550.0,
hopCount: 6

In this example, the best and worst mappings based on hop count alone are as follows:
minHopCountMapping: {SAP0=IEP0, SAP3=IEP5, SF1=IN1, SF2=IN1},
resourceNodePath: [IEP0, IN1, IN2, IEP5],
pathCost: 350.0,
hopCount: 3
maxHopCountMapping: {SAP0=IEP0, SAP3=IEP5, SF1=IN2, SF2=IN3},
resourceNodePath: [IEP0, IN3, IN4, IN2, IN4, IN3, IN4, IN2, IEP5],
pathCost: 450.0,
hopCount: 8

In addition, the costs associated with path B are as follows:
mappingPattern[8]: {SAP0=IEP0, SAP3=IEP5, SF1=IN3, SF2=IN2},
resourceNodePath: [IEP0, IN3, IN1, IN2, IEP5],
pathCost: 400.0,
hopCount: 4

In this example, although the mappings between service functions and physical resources associated with path A and path B are the same and include the same number of hops, path A is preferred due to its lower path cost. For example, path A includes link SL1 (1505-2) with a cost of 100, SL6 (1505-7) with a cost of 50, SL4 (1505-4) with a cost of 50, and SL5 (1505-6) with a cost of 50, for a total cost of 250. Path B, on the other hand, includes link SL1 (1505-2) with a cost of 100, SL3 (1505-4) with a cost of 100, SL2 (1505-4) with a cost of 150, and SL5 (1505-6) with a cost of 50, for a total cost of 400. In this example, an API call with which the service function chain mapping request may specify that the candidate mapping solutions should be ranked in terms of both path cost and hop count, but that path cost has a higher priority than hop count.

FIG. 14 is a flow diagram illustrating selected elements of an embodiment of a method for pruning and ranking candidate mapping solutions using a mapping system microservice, according to one embodiment.

Referring now to FIG. 14, a flow chart of selected elements of an embodiment of a method 1400 for pruning and ranking candidate mapping solutions using a mapping system microservice, as described herein, is depicted in flowchart form. In various embodiments, some or all of the operations of method 1400 may be performed using one or more microservices implemented as part of a resource orchestrator (such as resource orchestrator 108 illustrated in FIG. 1) or an SDN controller. In other embodiments, some or all of the operations of method 1400 may be performed as a service (e.g., by one or more microservices of a cloud-based service function chain mapping service or end-to-end network service orchestrator) on behalf of a local resource orchestrator, SDN controller, or other network element in response to a service chain mapping request. In particular embodiments, some or all of the operations of method 1400 may be performed by a pruning and ranking microservice of a service function chain mapping system. It is noted that certain operations described in method 1400 may be optional or may be rearranged in different embodiments.

Method 1400 may begin at 1402 by creating a plurality of candidate mapping solutions for mapping service functions specified in a received SFC request to physical network resources described in received resource information using a plurality of mapping system microservices. For example, the plurality of candidate mapping solutions may be created using any or all of the operations illustrated as 1202-1210 in FIG. 12A and/or any or all of the operations illustrated as 1222-1230 illustrated in FIG. 12B, in different embodiments.

In some embodiments, the method may (optionally) include, at 1404, using a pruning and ranking microservice to prune the candidate mapping solutions to remove unsuitable solutions based on minimum requirements and/or constraints specified for the SFC request. For example, in some embodiments, a SFC request may include a parameter value indicating whether or not candidate mapping solutions should be pruned and, if so, specifying one or more requirements or constraints for the SFC request, or other criteria, to be used in performing the pruning.

At 1406, method 1400 may include ranking at least the candidate mapping solutions remaining following a pruning at 1404 (or all of the candidate mapping solutions, if no pruning was performed) from most suitable to least suitable for satisfying the SFC request based on specified requirements for the SFC request, specified constraints for the SFC request, values of one or more parameters associated with the candidate mapping solutions, and/or other predefined ranking criteria.

At 1408, the method may include outputting data representing at least one of the highest ranked candidate mapping solutions. When data representing more than one candidate mapping solution is output, the output data may indicate the rankings of each of the candidate mapping solutions included in the output data. For example, in some embodiments, only the best candidate mapping solution (e.g., the highest ranked solution) may be represented in the output data. In other embodiments, the top n candidate mapping solutions (based on their respective rankings) may be included in the output data. The number n may be fixed in the mapping system, configurable by a user, or specified in the SFC request, in different embodiments.

Method 1400 may also include, at 1410, provisioning physical network resources for the SFC request based on the data output by the pruning and ranking microservice. For example, physical network resources may be provisioned for the SFC request based on the highest ranked one of the candidate mapping solutions output by the pruning and ranking microservice or using another one of multiple highly ranked candidate mapping solutions output by the pruning and ranking microservice selected by the recipient of the candidate mapping solutions using any suitable rules or criteria.

In at least some embodiments, the pruning and ranking microservice may operate continuously and in parallel with the service graph updater, resource graph updater, end point mappings creator, infra node mappings creator, and end-to-end mappings creator microservices to prune and/or rank additional collections of candidate mapping solutions as they are created by upstream microservices.

Note that, in some embodiments, all candidate mapping solutions created by an end-to-end mappings creator may be ranked and all of them may be output to the client or user on whose behalf the mapping was performed for consideration. In some embodiments, the candidate mappings created by an end-to-end mappings creator may not include all possible mappings between service function and physical resources such as, for example, if some end point mappings were removed based on pruning that was performed upstream by an end point mapping creator to avoid multiple service access points being mapped to the same infra end point.

As noted above, each microservice may be further extended to include many interworking microservices (e.g., multiple instances of each of the microservice) that operate in parallel to perform respective subsets of the operations of the microservice For example, each microservice may be expanded to include any number of parallel interworking microservice instances in order to handle dynamic loads and to further improve overall performance through increased parallelism. In one example, a service function chain mapping system may include 1000 end-to-end mappings creator instances running in parallel as individual microservices, and these 1000 microservices may collaborate among themselves to partition the load and to compose a final valid list of candidate mapping solutions. Similarly, 1000 pruner and ranker microservice instances may be created to operate in parallel, and these 1000 microservices may compete among themselves to identify better and better service function chain mapping solutions in a semi-distributed manner. In addition, the 1000 end-to-end mappings creator microservice instances may interact with the 1000 pruner and ranker microservice instances in parallel for further performance enhancement.

In some embodiments, for each microservice that includes multiple microservice instances, there may be a "master" instance of the microservice configured to partition inputs and to combine the results of the other instances of the microservice before passing them to the next microservice in the mapping sequence. For example, a master instance of a first microservice may combine the outputs of multiple other instances of the first microservice and pass the combined result to a master instance of a second (downstream) microservice. In this example, the master instance of the second (downstream) microservice may partition the results it receives from the master instance of the first microservice for processing on multiple other instances of the second (downstream) microservice. In other embodiments, particular instances of one microservice may pass their outputs to respective instances of a downstream microservice for processing without the outputs of the instances first being combined. The outputs of the instances of the downstream microservice may, similarly, be passed along to respective instances of the next downstream microservice for processing without first being combined or may be combined before being passed to the next downstream microservice, in different embodiments.

Figure 15:
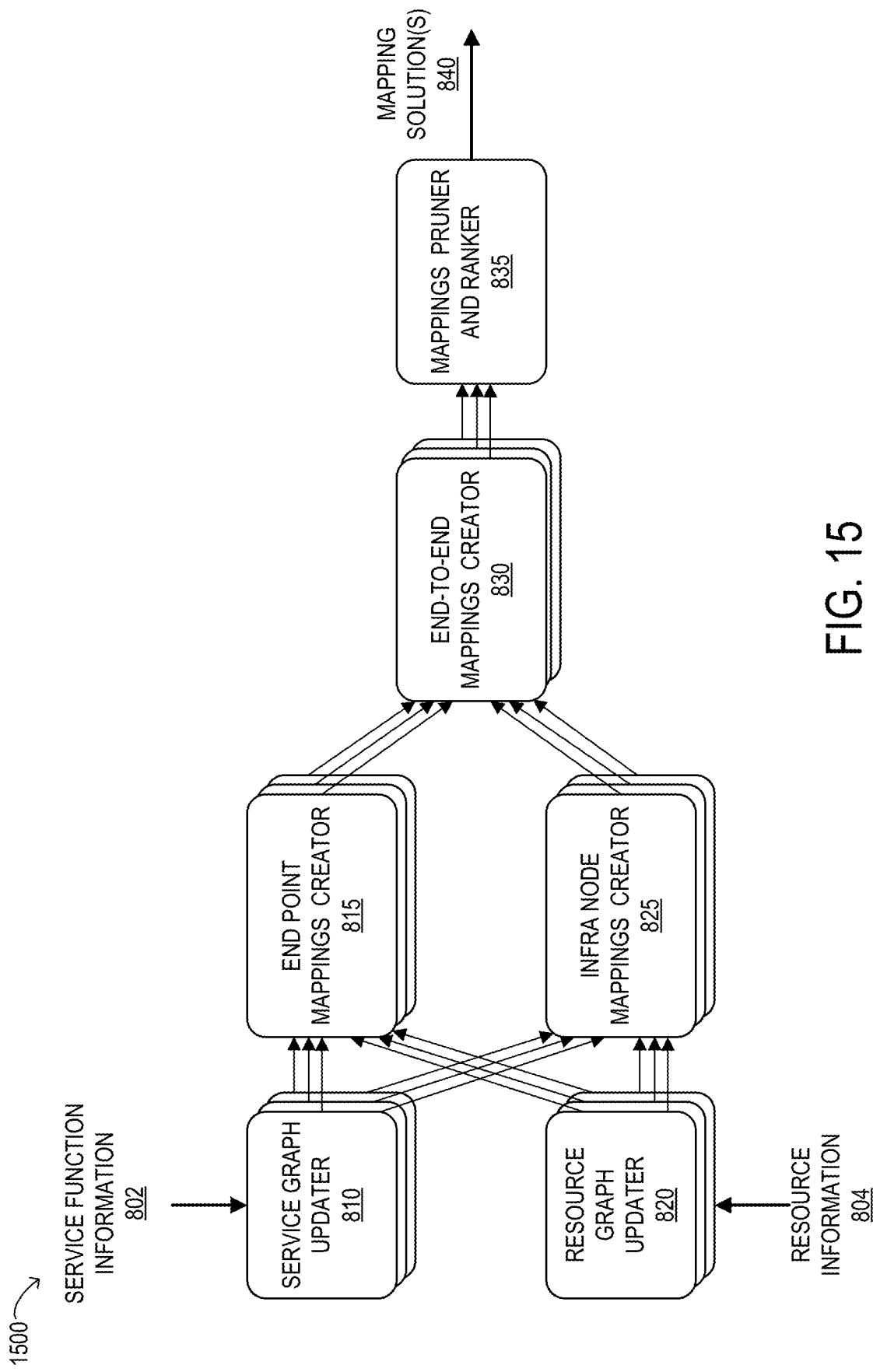
FIG. 15 is a block diagram illustrating selected elements of a system for mapping service function chains to physical network resources using multiple instances of each of multiple microservices to increase parallelism, according to some embodiments.

FIG. 15 is a block diagram illustrating selected elements of a system 1500 for mapping service function chains to physical network resources using multiple instances of each of multiple microservices to increase parallelism, according to some embodiments.

In operation, mapping system 1500, using multiple instances of multiple microservices operating in parallel, generates and outputs one or more service function chain mapping solutions 840 based on the received inputs.

In the illustrated example, the microservices included in mapping system 1500 are similar to those of mapping system 800 illustrated in FIG. 8 and may, individually, operate in a manner similar to that described above in reference to FIG. 8. However, in mapping system 1500, there are multiple instances of each of the following microservices: service graph updater 810, resource graph updater 820, end point mappings creator 815, infra node mappings creator 825, end-to-end mappings creator 830, and mappings pruner and ranker 835.

In at least some embodiments, as the information received as inputs 802 and 804 changes, multiple instances of microservices 810, 815, 820, 825, 830, and 835 may be configured to operate in parallel (e.g., in real time or near real time) to re-generate and output updated mapping solutions 840 in light of the changes.

The manner in which work is partitioned between multiple instances of a given microservice may be dependent, at least in part, on the functionality of the given microservice. In one example, each of multiple instances of an end point mapping creator may be given a different random seed with which to begin an exhaustive search for all possible permutations of end point mappings. In another example, each of multiple instances of a service graph updater may create a service graph for a respective one of a plurality of possible fixed-ordered chains for a received service function chain with flexible-ordered service functions. In yet another example, each of multiple instances of a pruning and ranking microservice may operate on a subset of mapping solution candidates to apply pruning and ranking criteria, after which the outputs of each instance may be combined and ranked as a whole by yet another instance of the pruning and ranking microservice. Other criteria may be applied to partition the work of a given microservice between multiple instances of the given microservice, in different embodiments.

Figure 16:
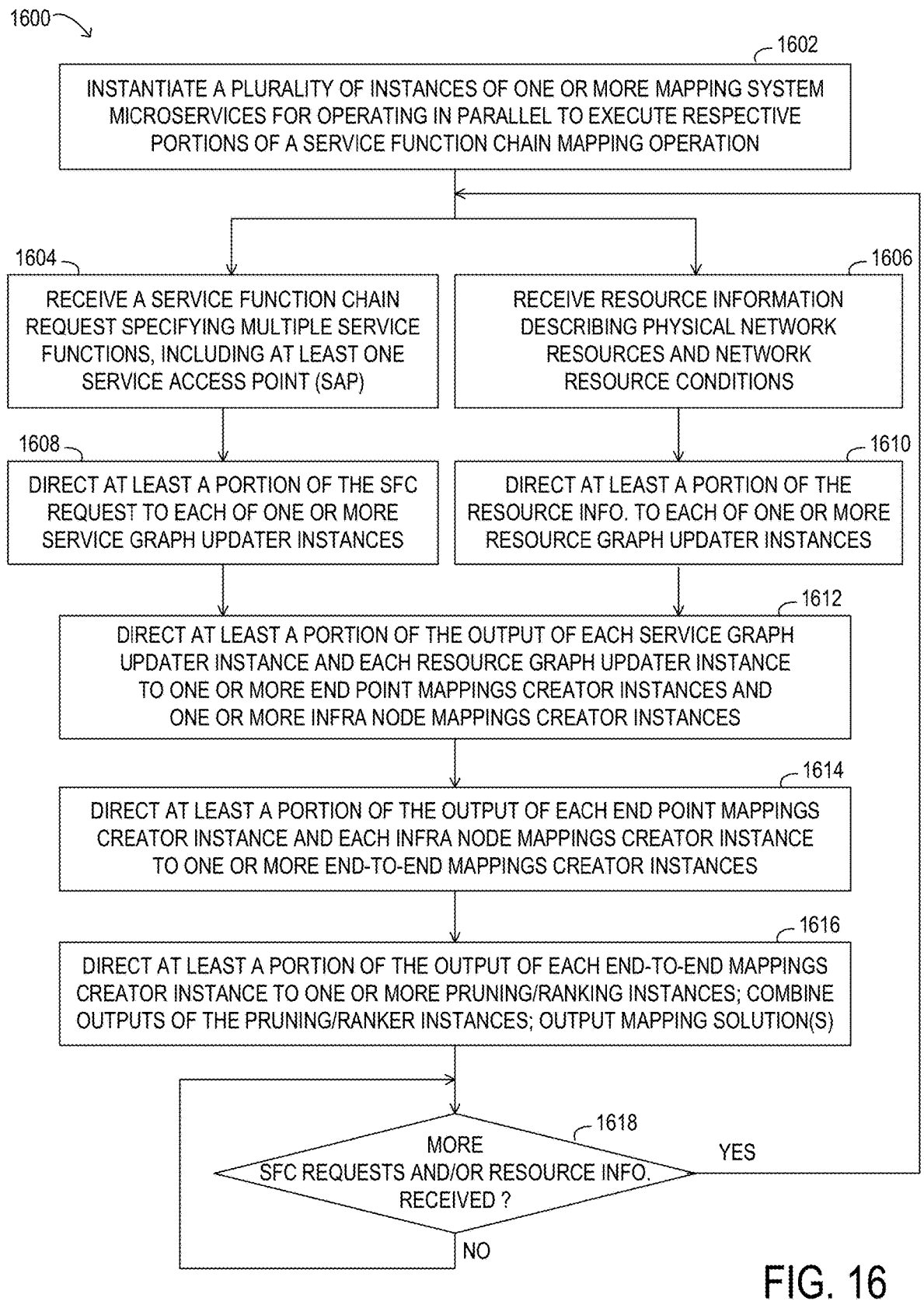
FIG. 16 is a flow diagram illustrating selected elements of an embodiment of a method for mapping service function chain requests to physical network resources using multiple instances of each of multiple microservices, according to one embodiment.

Referring now to FIG. 16, a flow chart of selected elements of an embodiment of a method 1600 for mapping service function chain requests to physical network resources using multiple instances of each of multiple microservices, as described herein, is depicted in flowchart form. In various embodiments, some or all of the operations of method 1600 may be performed using instances of one or more microservices implemented as part of a resource orchestrator (such as resource orchestrator 108 illustrated in FIG. 1) or an SDN controller. In other embodiments, some or all of the operations of method 1600 may be performed as a service (e.g., by instances of microservices of a cloud-based service function chain mapping service or end-to-end network service orchestrator) on behalf of a local resource orchestrator, SDN controller, or other network element in response to service chain mapping requests. In particular embodiments, some or all of the operations of method 1600 may be performed collectively by multiple instances of each of multiple microservices of a service function chain mapping system. It is noted that certain operations described in method 1600 may be optional or may be rearranged in different embodiments.

Method 1600 may begin, at 1602, by instantiating a plurality of instances of each of one or more mapping system microservices for operating in parallel to execute respective portions of a service function chain mapping operation. This may include, for example, instantiating multiple instances of each of a service graph updater microservice, a resource graph updater microservice, an end point mappings creator microservice, an infra node mappings creator microservice, an end-to-end mappings creator microservice and/or a pruning and ranking microservice, in various embodiments.

Method 1600 may include, at 1604, receiving a service function chain request specifying multiple service functions, including at least one service access point (SAP) and, at 1608, directing at least a portion of the service function chain request to each of one or more service graph updater instances.

In parallel with operations 1604 and 1608, method 1600 may include, at 1606, receiving resource information describing physical network resources and network resource conditions and, at 1610, directing at least a portion of the resource information to each of one or more resource graph updater instances.

At 1612, method 1600 may include directing at least a portion of the output of each service graph updater instance and at least a portion of the output of each resource graph updater instance to one or more end point mappings creator instances and to one or more infra node mappings creator instances.

At 1614, the method may include directing at least a portion of the output of each end point mappings creator instance and at least a portion of the output of each infra node mappings creator instance to one or more end-to-end mappings creator instances.

At 1616, method 1600 may include directing at least a portion of the output of each end-to-end mappings creator instance to one or more pruning and ranking instances, after which the outputs of the pruning and ranking instances may be combined and at least a subset of the resulting mapping solutions may be output, as described herein.

In at least some embodiments, the multiple instances of each of a service graph updater microservice, a resource graph updater microservice, an end point mappings creator microservice, an infra node mappings creator microservice, an end-to-end mappings creator microservice and/or a pruning and ranking microservice may operate continuously and in parallel to generate additional candidate mapping solutions as new or updated SFC requests are received and/or as updated resource information is received. For example, if and when, at 1618, new or updated SFC requests are received and/or updated resource information is received, method 1600 may return to 1604 and/or 1606, as appropriate, to begin an SFC mapping operation based on the new or updated inputs.

Figure 17:
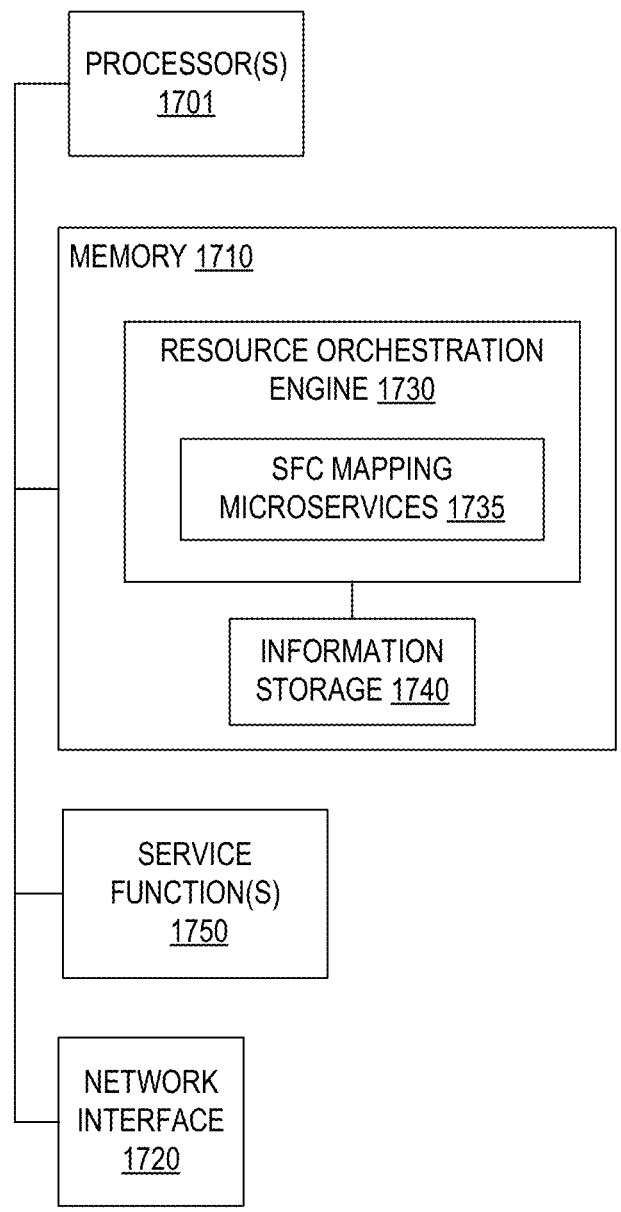
FIG. 17 is a block diagram illustrating selected elements of an example network element, according to at least some embodiments.

Referring now to FIG. 17, a block diagram of selected elements of an example network element 1700 is illustrated, according to at least some embodiments. In FIG. 17, network element 1700 is represented as a computer system including physical and logical components for implementing any of the network elements in a multi-domain network. In various embodiments, a network element similar to network element 1700 may implement any of the network elements 112 illustrated in FIG. 1, resource orchestrator 108 illustrated in FIG. 1, an SDN controller for a particular network or network domain in a multi-domain network, a network element of a local or cloud-based service function chain mapping service, or any of the infra end point nodes or infra nodes illustrated in FIG. 7A, 7B, 9A, 9B, 10A, 10B, 11A, 11B, or 13. However, some of these network elements may not include all of the components illustrated in FIG. 17, in some embodiments. In other embodiments, any of the network elements described herein may include more, fewer, or different components than those included in the example embodiment illustrated in FIG. 17.

As illustrated in this example, network element 1700 may, accordingly, include one or more processors 1701, memory 1710, one or more service functions 1750, and a network interface 1720. Processor 1701 may represent one or more individual processing units and may execute program instructions, interpret data, and process data stored by memory 1710 or another component within network element 1700 to implement the functionality of any of the network elements described herein, in different embodiments. In this example embodiment, each service function 1750 may represent circuitry, logic, and/or program instructions for implementing any of a variety of service functions that may be included in a service function chain including, but not limited to, those described herein.

In FIG. 17, memory 1710 may be communicatively coupled to processor 1701 and may comprise a system, device, or apparatus suitable to retain program instructions and data for a period of time (e.g., non-transitory computer-readable media). Memory 1710 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 1710 may include different numbers of physical storage devices, in various embodiments.

As shown in FIG. 17, memory 1710 may include instructions to implement functionality of resource orchestration engine 1730. In some embodiments, resource orchestration engine 1730 may implement a service function chain mapping system that uses one or more instances of each of multiple SFC mapping microservices 1735 to generate and output mapping solutions for service function chains based on inputs including service function information (for particular SFC requests) and resource information, as described above. In at least some embodiments, SFC mapping microservices 1735 may include one or more instances of a service graph updater 810, a resource graph updater 820, an end point mappings creator 815, an infra node mappings creator 825, an end-to-end mappings creator 830, and a mappings pruner and ranker 835, as shown in FIGS. 8 and 15. Collectively, SFC mapping microservices may implement any of the elements of method 1200 illustrated in FIG. 12A, method 1220 illustrated in FIG. 12B, method 1400 illustrated in FIG. 14, and/or method 1600 illustrated in FIG. 16, in various embodiments. Certain portions of the program instructions may be implemented using custom code or may include or call functions within standard utilities or open source software, in different embodiments.

Memory 1710 may also include information storage 1740, which may store information usable by resource orchestration engine 1730 including, but not limited to, data representing one or more received SFC requests, received resource information, one or more service graphs, one or more resource graphs, one or more end point mapping patterns, one or more infra node mapping patterns, and one or more end-to-end mapping solutions (before and/or after pruning and/or ranking), values of any default or configurable parameters used to implement the functionality described herein or any other functionality of network element 1700 including, but not limited to, values for configurable parameters specifying pruning and/or ranking preferences, or any other data usable to implement the service function mapping systems and services described herein.

In at least some embodiments of the present disclosure, service function chain mapping systems and methods for mapping service function chains to physical network resources may include receiving service function chain requests, each specifying a respective plurality of service functions including at least one service access point and one other service function and generating a corresponding service graph including first service links between consecutive ones of the specified service functions. The systems and methods may also include receiving resource information describing capabilities of physical network resources in a physical network and a topology of the physical network and generating a corresponding resource graph including first infra links between pairs of connected ones of the described physical network resources. The systems and methods may include creating multiple candidate mapping solutions for mapping service functions to respective physical network resources dependent on the service graphs and the resource graphs, and outputting at least a subset of the mapping solutions.

In at least some embodiments, each of generating a service graph, generating a resource graph, and creating candidate mapping solutions may be performed by a respective microservice, and these microservices may operate in parallel to create the candidate mapping solutions in real time. Other microservices included in the service function chain mapping systems may include end point mappings creator, infra node mappings creators, and pruning and ranking microservices, in various embodiments. The system may include multiple instances of each microservice to further extent parallelism.

In at least some embodiments, an end-to-end network service orchestrator that uses the techniques described herein may enable zero-touch network service provisioning for multi-cloud applications across both data center site(s) and customer premise site(s). For example, these techniques may be used to automatically map user-specified virtual network functions onto physical network devices from among a large number of service function chain mapping options by automatically calculating an optimal path over which to chain the mapped network functions in a proper order. The service function chain mapping systems described herein may be highly scalable to support both scaling up (e.g., to support a large number of service function chains and/or service function chains that include a large number of service functions) and scaling out (e.g., to support service function chaining across multiple clouds or multiple network domains) by enabling parallel instances of microservices on a per microservice basis. The ability to instantiate multiple interworking microservice instances may allow the systems to handle dynamic loads and to improve overall performance through increased parallelism.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for mapping service function chains to physical network resources, comprising:
receiving a first service function chain request specifying a first plurality of service functions including at least one service access point and one other service function;
generating, for the first service function chain request, a service graph including first service links between consecutive ones of the first plurality of service functions;
receiving first resource information describing capabilities of first physical network resources in a physical network and a topology of the physical network;
generating, dependent on the first resource information, a resource graph including first infra links between pairs of connected ones of the first physical network resources;
creating, dependent on the service graph and the resource graph, a first plurality of mapping solutions for mapping the service functions specified in the first service function chain request to respective ones of the first physical network resources; and
outputting one or more of the first plurality of mapping solutions;
wherein each of generating the service graph, generating the resource graph, and creating the first plurality of mapping solutions is performed by a respective microservice, and the respective microservices that perform generating the service graph, generating the resource graph, and creating the first plurality of mapping solutions operate in parallel.

2. The method of claim 1, further comprising:
receiving a second service function chain request specifying a second plurality of service functions; and
responsive to receiving the second service function chain request:
updating the service graph to include second service links between consecutive ones of the second plurality of service functions; and
creating, dependent on the updated service graph, a second plurality of mapping solutions for mapping the service functions specified in the second service function chain request to respective ones of the first physical network resources.

3. The method of claim 1, further comprising:
receiving second resource information describing capabilities of second physical network resources in the physical network; and
responsive to receiving the second resource information:
updating the resource graph to include second infra links between pairs of connected ones of the second physical network resources; and
creating, dependent on the updated resource graph, a second plurality of mapping solutions for mapping the first plurality of service functions to respective ones of the second physical network resources.

4. The method of claim 1, wherein:
the method further comprises pruning the first plurality of mapping solutions to remove mapping solutions that do not meet predefined criteria for mapping the first plurality of service functions to physical network resources;
pruning the first plurality of mapping solutions is performed by a pruning and ranking microservice that operates in parallel with the respective microservices that perform generating the service graph, generating the resource graph, and creating the first plurality of mapping solutions; and
outputting one or more of the first plurality of mapping solutions comprises outputting at least a subset of the first plurality of mapping solutions remaining following the pruning.

5. The method of claim 1, wherein:
the method further comprises ranking the first plurality of mapping solutions from most suitable for mapping the first plurality of service functions to physical network resources to least suitable for mapping the first plurality of service functions to physical network resources based on predefined ranking criteria;
ranking the first plurality of mapping solutions is performed by a pruning and ranking microservice that operates in parallel with the respective microservices that perform generating the service graph, generating the resource graph, and creating the first plurality of mapping solutions; and
outputting one or more of the first plurality of mapping solutions comprises outputting, based on the ranking, a subset of the first plurality of mapping solutions.

6. The method of claim 1, wherein:
the method further comprises:
creating a first plurality of end point mappings between each of one or more service access points specified in the first service function chain request and respective infra end point nodes in the first physical network resources; and
creating a first plurality of infra node mappings between each of one or more service functions specified in the first service function chain request other than service access points and respective infra nodes in the first physical network resources;
creating the first plurality of mapping solutions comprises combining the first plurality of end point mappings and the first plurality of infra node mappings; and
creating the first plurality of end point mappings and creating the first plurality of infra node mappings are performed by respective microservices that operate in parallel with the respective microservices that perform generating the service graph, generating the resource graph, and creating the first plurality of mapping solutions.

7. The method of claim 6, wherein creating the first plurality of end point mappings comprises pruning the first plurality of end point mappings to remove end point mappings in which multiple service access points are mapped to a same infra end point node.

8. The method of claim 1, wherein at least one of the respective microservices that perform generating the service graph, generating the resource graph, and creating the first plurality of mapping solutions comprises a plurality of microservice instances that operate in parallel to perform respective subsets of the operations of the microservice.

9. The method of claim 8, wherein the respective subsets of operations into which the operations of a given microservice are partitioned are dependent on the functionality of the given microservice.

10. The method of claim 1, wherein:
in the service graph, the first service links between consecutive ones of the first plurality of service functions are unidirectional links; and
in the resource graph, the first infra links between pairs of connected ones of the first physical network resources are bidirectional links.

11. The method of claim 1, further comprising replacing the respective microservice that performs generating the service graph, generating the resource graph, or creating the first plurality of mapping solutions with an alternate microservice that performs at least one of the functions of the respective microservice differently than does the respective microservice.

12. The method according to claim 1, wherein
the service graph includes at least one service access point, at least one service function and at least one service link; and
the resource graph includes at least one infra end point, infra node and infra link.

13. The method according to claim 12, wherein the infra end points to which respective service access points are mapped in a fixed order within the first plurality of mapping solutions, and the infra nodes are present in any order within the first mapping solutions.

14. A system, comprising a processor having access to memory media storing instructions executable by the processor to implement a service function chain mapping system, the service function chain mapping system comprising:
a service graph updater configured to:
receive a first service function chain request specifying a first plurality of service functions including at least one service access point and one other service function; and
generate, for the first service function chain request, a service graph including first service links between consecutive ones of the first plurality of service functions;
a resource graph updater configured to:
receive first resource information describing capabilities of first physical network resources in a physical network and a topology of the physical network; and
generate, dependent on the first resource information, a resource graph including first infra links between pairs of connected ones of the first physical network resources; and
an end-to-end mappings creator configured to generate, dependent on the service graph and the resource graph, a first plurality of mapping solutions for mapping the first plurality of service functions to respective ones of the first physical network resources;
wherein the service graph updater, the resource graph updater, and the end-to-end mappings creator operate in parallel as respective microservices to collectively create the first plurality of mapping solutions.

15. The system of claim 14, wherein:
the service graph updater is further configured to:
receive one or more additional service function chain requests, each specifying a respective plurality of service functions including at least one service access point and one other service function; and update, for each of the additional service function chain requests, the service graph to include respective service links between consecutive ones of the respective plurality of service functions specified in the additional service function chain request;

the resource graph updater is further configured to:
receive one or more additional resource information inputs, each describing capabilities of respective physical network resources in the physical network; and update, for each of the additional resource information inputs, the resource graph to include respective infra links between pairs of connected ones of the respective physical network resources described in the additional resource information input; and the end-to-end mappings creator is further configured to generate, responsive to each update of the service graph or the resource graph, a respective plurality of mapping solutions reflecting the update.

16. The system of claim 14, wherein the service function chain mapping system further comprises:
a pruning and ranking microservice configured to perform one or more of:
pruning the first plurality of mapping solutions to remove mapping solutions that do not meet predefined criteria for mapping the first plurality of service functions to physical network resources;
ranking the first plurality of mapping solutions from most suitable for mapping the first plurality of service functions to physical network resources to least suitable for mapping the first plurality of service functions to physical network resources based on predefined ranking criteria; and
outputting, dependent on one or more of the pruning and the ranking, a subset of the first plurality of mapping solutions; and
the pruning and ranking microservice operates in parallel with the service graph updater, the resource graph updater, and the end-to-end mappings creator.

17. The system of claim 14, wherein:
the service function chain mapping system further comprises:
an end point mappings creator microservice configured to create a first plurality of end point mappings between each of one or more service access points specified in the first service function chain request and respective infra end point nodes in the first physical network resources; and
an infra node mappings creator microservice configured to create a first plurality of infra node mappings between each of one or more service functions specified in the first service function chain request other than service access points and respective infra nodes in the first physical network resources;
to generate the first plurality of mapping solutions, the end-to-end mappings creator is configured to combine the first plurality of end point mappings and the first plurality of infra node mappings; and
the end point mappings creator microservice and the infra node mappings creator microservice operate in parallel with the service graph updater, the resource graph updater, and the end-to-end mappings creator.

18. The system of claim 17, wherein the end point mappings creator microservice is further configured to prune the first plurality of end point mappings to remove end point mappings in which multiple service access points are mapped to a same infra end point node.

19. The system of claim 14, wherein at least one of the service graph updater, the resource graph updater, and the end-to-end mappings creator comprises a plurality of microservice instances that operate in parallel to perform respective subsets of the operations of the microservice.

20. The system of claim 19, wherein the respective subsets of operations into which the operations of a given microservice are partitioned are dependent on the functionality of the given microservice.

21. The system of claim 19, wherein:
in the service graph, the first service links between consecutive ones of the first plurality of service functions are unidirectional links; and
in the resource graph, the first infra links between pairs of connected ones of the first physical network resources are bidirectional links.

22. The system of claim 19, wherein the service function chain mapping system further comprises, for at least one of the service graph updater, the resource graph updater, and the end-to-end mappings creator, an alternate microservice that performs at least one of the functions of the respective microservice differently than does the respective microservice.

* * * * *